(12) United States Patent
Hishida et al.

(10) Patent No.: US 11,489,387 B2
(45) Date of Patent: Nov. 1, 2022

(54) COIL AND MOTOR USING SAME

(71) Applicant: Panasonic Intellectual Property Management Co., Ltd., Osaka (JP)

(72) Inventors: Mitsuoki Hishida, Osaka (JP); Yuichi Yoshikawa, Osaka (JP); Hirokazu Yamauchi, Osaka (JP); Keiichiro Nukada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 16/500,411

(22) PCT Filed: Mar. 28, 2018

(86) PCT No.: PCT/JP2018/012671
§ 371 (c)(1),
(2) Date: Oct. 3, 2019

(87) PCT Pub. No.: WO2018/190124
PCT Pub. Date: Oct. 18, 2018

(65) Prior Publication Data
US 2020/0195075 A1     Jun. 18, 2020

(30) Foreign Application Priority Data
Apr. 13, 2017 (JP) .............................. JP2017-079698

(51) Int. Cl.
*H02K 3/18* (2006.01)
*H02K 1/14* (2006.01)
(Continued)

(52) U.S. Cl.
CPC ............... *H02K 3/18* (2013.01); *H02K 1/146* (2013.01); *H02K 1/276* (2013.01); *H02K 3/24* (2013.01);
(Continued)

(58) Field of Classification Search
CPC .. H02K 3/12; H02K 3/18; H02K 3/20; H02K 15/045; H02K 5/04; H02K 3/28;
(Continued)

(56) References Cited

U.S. PATENT DOCUMENTS 10,355,570 B2 *  7/2019  Inoue ................... H02K 21/24
10,931,154 B2 *  2/2021  Masuda ................ H02K 21/24
(Continued)

FOREIGN PATENT DOCUMENTS

CN   104143414 A   11/2014
DE   102012212637    1/2014
(Continued)

OTHER PUBLICATIONS

The Extended European Search Report dated Apr. 3, 2020 for the related European Patent Application No. 18785233.0.
(Continued)

*Primary Examiner* — Leda T Pham
(74) *Attorney, Agent, or Firm* — McDermott Will & Emery LLP

(57) ABSTRACT

A coil includes: a series of turns constituted by a first turn to an n-th turn of a conductive wire having a polygonal cross-section, where n is an integer equal to or larger than 3, and the conductive wire is wound in a spiral shape and is stacked in a direction from downward toward upward; and an insulating member disposed on either an upper surface or a lower surface of an i-th turn, where i is an integer satisfying $1 \le i \le n$.

7 Claims, 20 Drawing Sheets

(51) Int. Cl.
*H02K 1/276* (2022.01)
*H02K 3/24* (2006.01)
*H02K 3/32* (2006.01)
*H02K 21/16* (2006.01)

(52) U.S. Cl.
CPC .............. *H02K 3/325* (2013.01); *H02K 21/16* (2013.01); *H02K 2213/03* (2013.01)

(58) Field of Classification Search
CPC .. H02K 3/00; H02K 3/24; H02K 3/30; H02K 3/32; H02K 3/325; H02K 3/52; H02K 3/522
USPC ......................................... 310/180, 201, 208
See application file for complete search history.

(56) References Cited

U.S. PATENT DOCUMENTS

| | | | | |
|---|---|---|---|---|
| 2006/0006757 A1* | 1/2006 | Seguchi | ............... | H02K 3/28 310/184 |
| 2007/0222333 A1 | 9/2007 | Hattori et al. | | |
| 2011/0127872 A1* | 6/2011 | Podack | .............. | H02K 15/0421 310/180 |
| 2014/0300239 A1* | 10/2014 | Takizawa | ................. | H02K 3/38 310/208 |
| 2014/0333409 A1* | 11/2014 | Ono | .......................... | H01F 5/06 336/223 |
| 2015/0279550 A1 | 10/2015 | Kitami et al. | | |
| 2015/0288262 A1* | 10/2015 | Tsuiki | ............... | H02K 15/0421 29/605 |
| 2016/0380499 A1* | 12/2016 | Nabeshima | ............ | H01B 3/308 174/110 SR |
| 2017/0271075 A1 | 9/2017 | Kitami et al. | | |
| 2018/0041087 A1 | 2/2018 | Hayashizaka et al. | | |
| 2019/0001802 A1 | 1/2019 | Shinkai et al. | | |

FOREIGN PATENT DOCUMENTS

| | | |
|---|---|---|
| JP | 36-023208 Y | 9/1961 |
| JP | 52-003081 B | 1/1977 |
| JP | 52-025249 U | 2/1977 |
| JP | 54-006009 Y | 3/1979 |
| JP | 54-183605 U | 12/1979 |
| JP | 60-087643 A | 5/1985 |
| JP | 6-276706 | 9/1994 |
| JP | 9-312231 | 12/1997 |
| JP | 2003-180046 | 6/2003 |
| JP | 2007-259674 A | 10/2007 |
| JP | 2014-123680 | 7/2014 |
| JP | 2014-220466 | 11/2014 |
| JP | 2016-149930 A | 8/2016 |
| JP | 2017-036026 A | 2/2017 |
| WO | 2014/096953 | 6/2014 |

OTHER PUBLICATIONS

English Translation of Chinese Search Report dated Nov. 4, 2020 for the related Chinese Patent Application No. 201880024129.2.
International Search Report of PCT application No. PCT/JP2018/012671 dated Jul. 3, 2018.

* cited by examiner

COIL AND MOTOR USING SAME

TECHNICAL FIELD

The present disclosure relates to a coil in which a conductive wire having a polygonal cross-section is wound, and relates to a motor using the coil.

BACKGROUND ART

In recent years, there has been an increasing demand for motors for industry use and in-vehicle use. In this situation, improvement of efficiency of motors and reduction in cost are required.

As a method for improving efficiency of a motor, it is known that a space factor of coils disposed in slots of a stator is improved. By improving the space factor of the coils, it is possible to reduce a loss caused by a current flowing through the coils during driving of the motor.

As a method for improving the space factor of coils, there is proposed a configuration in which cast coils having a rectangular cross-section made of a copper material are disposed in slots (for example, see PTL 1).

By using a coil as disclosed in PTL 1, a contact area between neighboring turns of the coil becomes large. This improves heat dissipation efficiency of the coil compared with, for example, a coil using a conductive wire having a circular cross-section or other coils. On the other hand, since the contact area between the turns is larger, there is a larger possibility that an insulating film covering a surface of the conductive wire of the coil will be damaged or fall off, so that insulation between neighboring turns may be lost.

CITATION LIST

Patent Literature

PTL 1: German Patent Application Publication No. DE 102012212637

SUMMARY OF THE INVENTION

The present disclosure has been made in view of the above points, and an object of the present disclosure is to achieve a coil that has a polygonal cross-section and can maintain insulation between neighboring turns and to achieve a motor using the coil.

To achieve the above object, a coil of the present disclosure includes: a series of turns constituted by a first turn to an n-th turn of a conductive wire having a polygonal cross-section, where n is an integer equal to or larger than 3, and the conductive wire is wound in a spiral shape and is stacked in a direction from downward toward upward; and an insulating member disposed on either an upper surface or a lower surface of an i-th turn, where i is an integer satisfying $1 \leq i \leq n$.

This configuration can ensure insulation between neighboring turns of the coil.

The insulating member preferably maintains a gap between the i-th turn and the turn adjacent to the i-th turn at a predetermined distance, and an insulating layer is preferably provided on a surface of the conductive wire.

This configuration can surely insulate between neighboring turns of the coil.

The insulating member preferably includes a plurality of insulating members disposed along a winding direction of the i-th turn and the plurality of insulating members are preferably arranged apart from each other along the winding direction.

This configuration makes it possible to hold a part between neighboring turns with a jig or the like, and handling of the coil therefore becomes easy.

The insulating member may extend continuously in a line shape along the winding direction of the i-th turn.

This configuration can stably maintain a gap between neighboring turns and can more surely insulate between neighboring turns of the coil.

A positioning part for positioning and holding the insulating member is preferably provided on at least one of: a surface, of an (i−1)th turn, facing the i-th turn; and a surface, of the i-th turn, facing the (i−1)th turn.

This configuration makes it easy to dispose the insulating member on each turn of the coil.

The insulating member preferably further includes: intervening parts one of which is provided to intervene between the i-th turn and a turn adjacent to the i-th turn and another of which is provided to intervene between a j-th turn and a turn adjacent to the j-th turn, where j is an integer satisfying $1 \leq j \leq n$ and $i \neq j$; and a coupler that couples the intervening parts to each other on an outer peripheral side of the conductive wire.

This configuration makes it easy to attach the insulating member to the coil.

The intervening parts are each disposed to intervene between each of all neighboring turns of the conductive wire, and the coupler couples all of the intervening parts to each other on an outer peripheral side of all of the turns.

The insulating member is preferably constituted by a single sheet of insulating paper, and each of the intervening parts is formed in such a manner that a part having been cut out is bent.

This configuration does not need to use a molding die or the like to form the insulating member, and manufacturing cost can be reduced.

The i-th turn is constituted by the conductive wire wound in a rectangular shape, and it is preferable that the following relationship preferably hold.

$$4 < L/(W1+W2+H1+H2) < 22.3.$$

In the above relationship, W1 is a width, of the conductive wire at the i-th turn, on an upper surface side; W2 is a width, of the conductive wire at the i-th turn, on a lower surface side; H1 is a thickness, of the conductive wire at the i-th turn, on an inner peripheral side; H2 is a thickness, of the conductive wire at the i-th turn, of an outer peripheral side; and L is a length, of the conductive wire, on an inner peripheral side of one side of the rectangular shape at the i-th turn.

This configuration enables the insulating member to be surely held between neighboring turns of the coil and enables insulation between the turns.

Further, the motor disclosed in the present disclosure includes a stator having: a stator core; teeth protruding from the stator core; and coils wound on the teeth.

This configuration can ensure insulation in the coils. This can maintain a withstand voltage of the motor for a long period of time, and reliability of the motor can be improved.

According to the present disclosure, insulation can be surely secured between the individual turns in the coil. In addition, a highly reliable motor can be achieved.

DESCRIPTION OF EMBODIMENTS

Hereinafter, exemplary embodiments of the present disclosure will be described in detail with reference to the drawings. The following description of the preferred exemplary embodiments are inherently only examples and are not intended at all to limit the present disclosure, applications of the present disclosure, or use of the present disclosure.

First Exemplary Embodiment

[Structure of Motor]

Figure 1A:
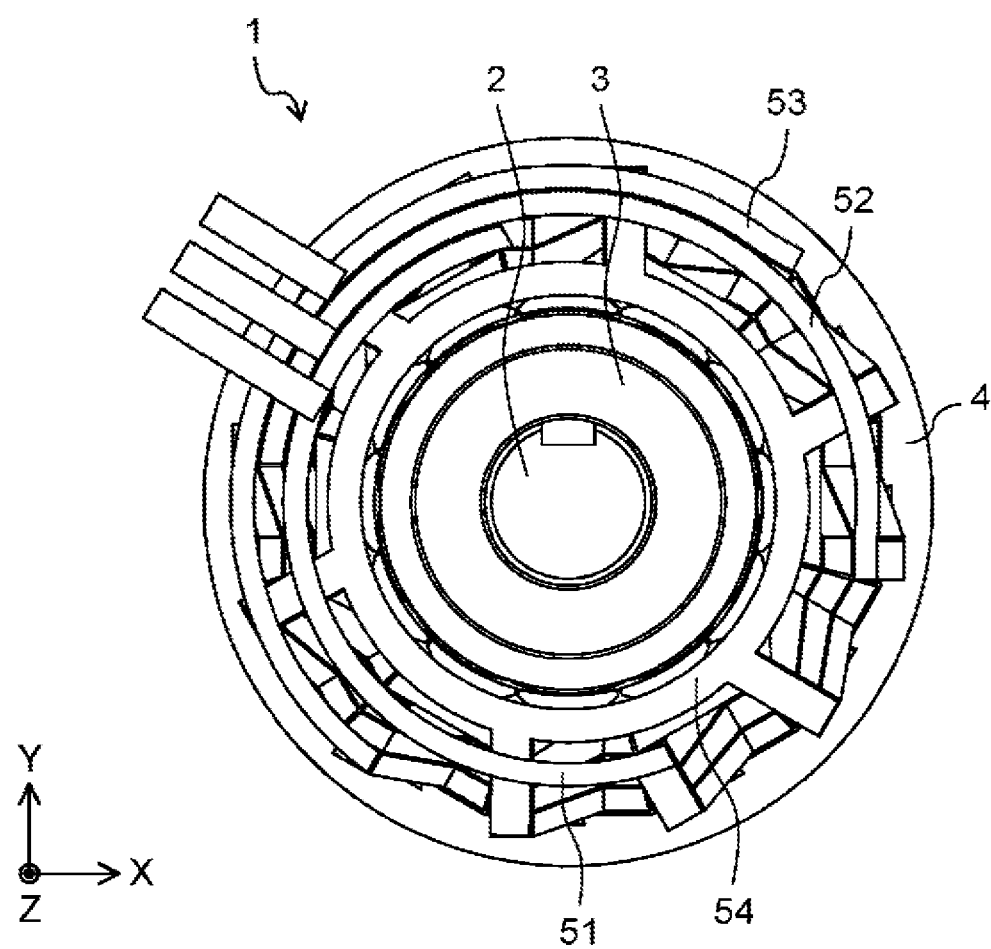
FIG. 1A is an upper surface view of a motor according to a first exemplary embodiment.
Figure 1B:
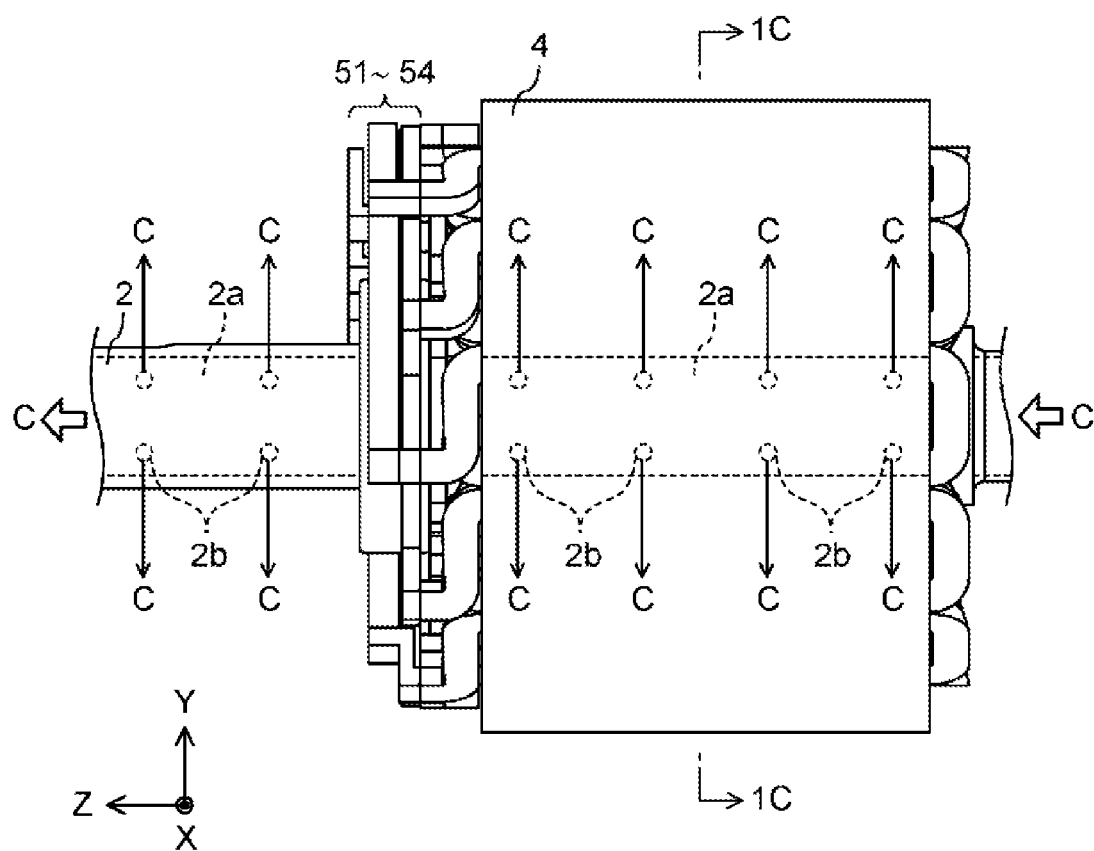
FIG. 1B is a side view showing the motor according to the first exemplary embodiment.
Figure 1C:
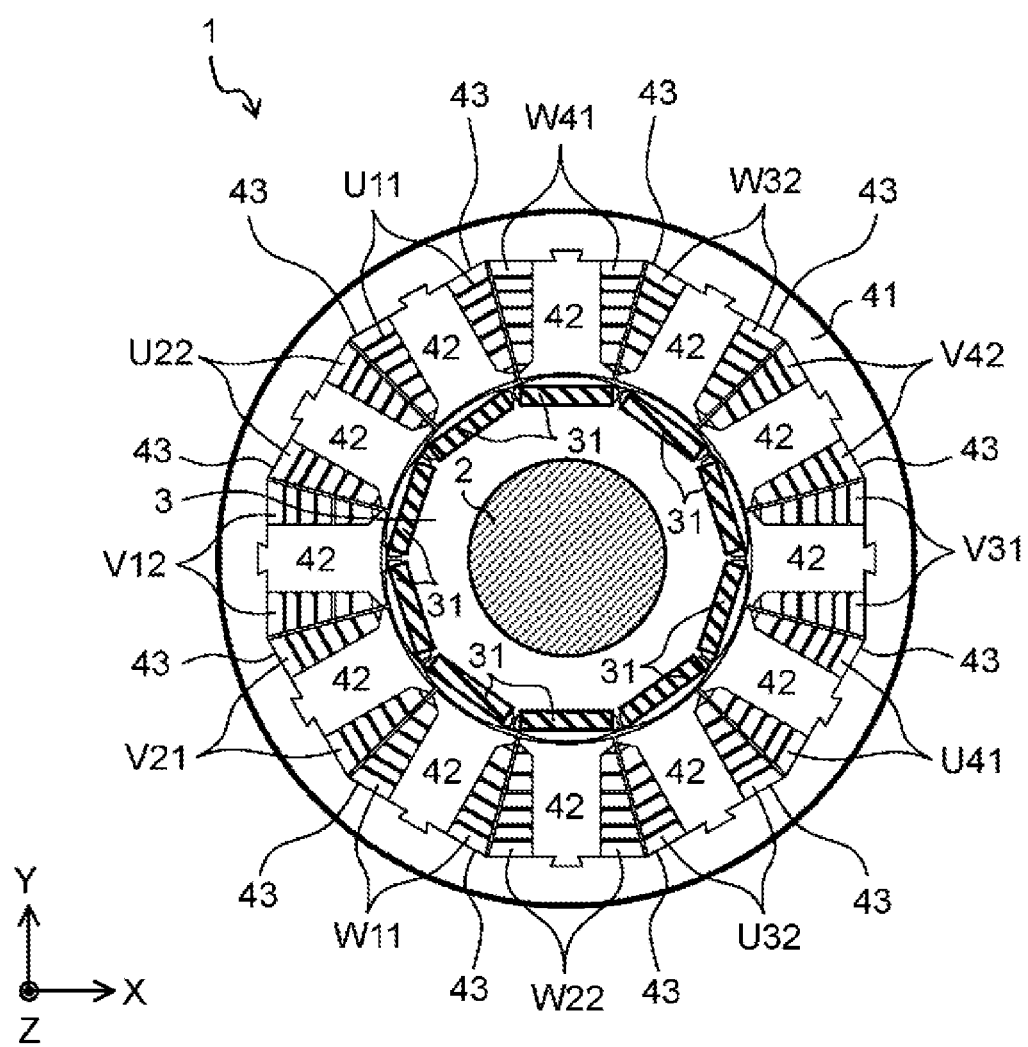
FIG. 1C is a sectional view taken along line 1C-1C in FIG. 1B.

FIG. 1A is an upper surface view showing motor 1 according to a first exemplary embodiment. FIG. 1B is a side view showing motor 1 according to the first exemplary embodiment. FIG. 1C is a sectional view taken along line 1C-1C in FIG. 1B. However, any of the drawings does not show a cover case and the like. Motor 1 includes, inside a cover case (not shown), shaft 2, rotor 3, stator 4, coils U11 to U41, V12 to V42, and W11 to W41, and bus bars 51 to 54.

Here, a longitudinal direction of shaft 2 (direction perpendicular to a paper surface of FIG. 1A) is referred to as a Z-axis direction, and directions perpendicular to the Z-axis direction (direction parallel to the paper surface of FIG. 1A) are referred to as an X-axis direction and a Y-axis direction in some cases. The X-axis direction and the Y-axis direction perpendicularly intersect each other.

The term "integrally" means not only a state where a plurality of components are connected mechanically, for example, by bolting, swaging, or the like but also a state where the components are electrically connected into one object by material boding such as covalent bonding, ionic bonding, or metallic bonding or a state where whole the components are electrically connected into one object by material boding such as fusion.

Shaft 2 has, inside shaft 2, hollow part 2a extending in the Z-axis direction. In a side surface of shaft 2, there are provided a plurality of through holes 2b. Hollow part 2a is a passage through which cooling medium C flows to cool the inside of motor 1. Cooling medium C flows inside hollow part 2a along the Z-axis direction and circulates inside motor 1. Further, part of cooling medium C flowing inside hollow part 2a flows out through a plurality of through holes 2b and flows also from a central side of motor 1 to an outer side, in other words, flows from rotor 3 in a direction toward a place where stator 4 is positioned, thereby cooling rotor 3 and stator 4.

Rotor 3 is provided in contact with an outer periphery of shaft 2. Rotor 3 includes magnets 31 constituted by N-poles and S-poles alternately arranged, along an outer peripheral direction of shaft 2, to face stator 4. In the present exemplary embodiment, neodymium magnets are used as magnets 31 used for rotor 3; however, a material, shape, and material quality of magnets 31 can be appropriately changed depending on an output of the motor and the like.

Stator 4 has: stator core 41 having a substantially circular ring shape; a plurality of teeth 42 equidistantly provided along an inner periphery of stator core 41; and slots 43 each provided between teeth 42. Stator 4 is disposed on an outer side of rotor 3 with a certain distance apart from rotor 3 when viewed from the Z-axis direction.

Stator core 41 is formed, for example, by stacking electromagnetic steel sheets containing silicon and the like and then by die-cutting the stacked electromagnetic steel sheets.

In the present exemplary embodiment, the number of poles of rotor 3 is totally 10 including 5 N-poles and 5 S-poles facing stator 4. The number of slots 43 is 12. However, the number of poles and the number of slots 43 of rotor 3 are not particularly limited to the above figures, and the present disclosure can apply to a combination of another number of poles and another number of slots.

Stator 4 has 12 coils U11 to U41, V12 to V42, and W11 to W41. Each of coils U11 to U41, V12 to V42, and W11 to W41 is attached to the corresponding tooth 42 and is disposed in the corresponding slots 43 when viewed from the Z-axis direction. That is, each of coils U11 to U41, V12 to V42, and W11 to W41 is concentratedly wound on each tooth 42. Further, the coils are disposed while coils U11 to U41 are integrated with bus bar 51, coils V12 to V42 are integrated with bus bar 52, and coils W11 to W41 are integrated with bus bar 53.

Here, regarding reference marks UPQ, VPQ, and WPQ representing the coils, the first characters each represent each phase of motor 1 (U-phase, V-phase, and W-phase in the case of the present exemplary embodiment). The second characters each represent the order of arrangement of the coils in the same phase. The third characters each represent a winding direction of each coil, and 1 and 2 respectively represent the clockwise direction and the anticlockwise direction in the present exemplary embodiment. Therefore, coil U11 indicates that the coil is at the first arrangement order in U-phase and is wound in the clockwise direction. Coil V42 indicates that the coil is at the fourth arrangement order in V-phase and is wound in the anticlockwise direction. Note that the "clockwise" is a right turn when viewed from a center of motor 1, and the "anticlockwise" is a left turn when viewed from the center of motor 1.

Strictly speaking, coils U11 and U41 are U-phase coils, and coils U22 and U32 are U-bar phase coils (which generate a magnetic field in the opposite direction of the magnetic field generated by U-phase coils). However, in the following description, both are collectively referred to as U-phase coils, unless particularly mentioned. Similarly, coils V12 to V42 and coils W11 to W41 are collectively referred to as V-phase coils and W-phase coils, respectively.

[Structure of Coil]

Figure 2:
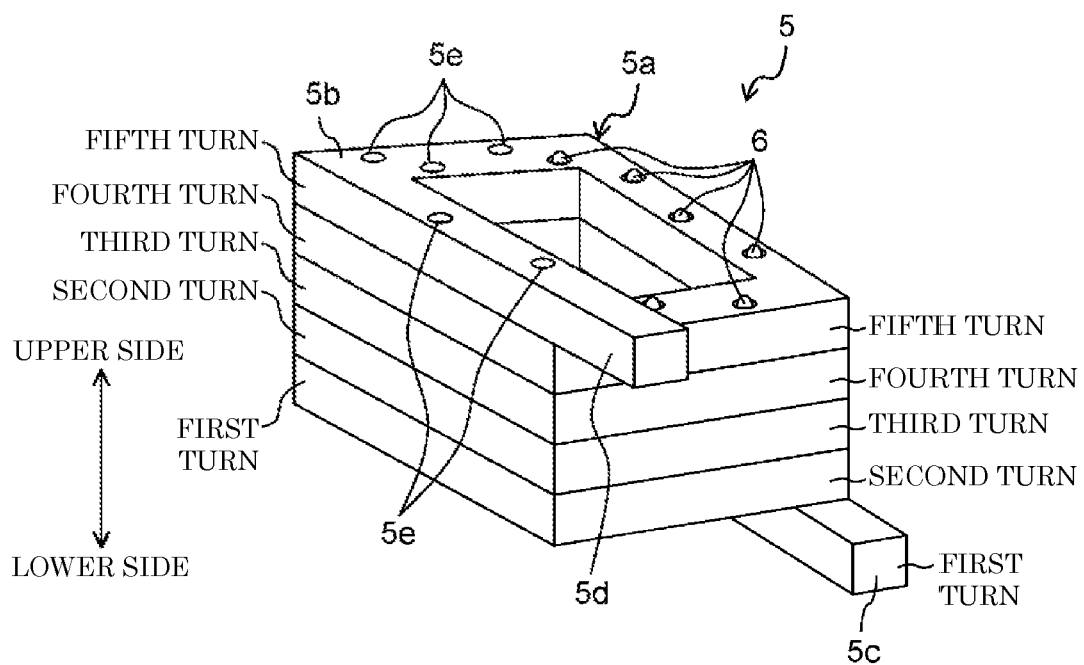
FIG. 2 is a perspective view showing a coil according to the first exemplary embodiment.
Figure 3:
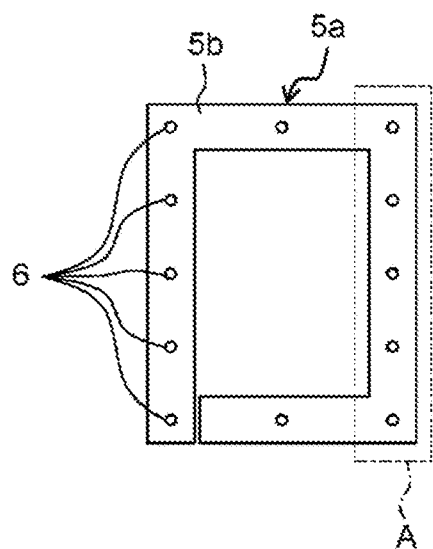
FIG. 3 is an upper surface view showing a third turn of the coil according to the first exemplary embodiment.

FIG. 2 is a perspective view showing coil 5 according to the first exemplary embodiment. FIG. 3 is an upper surface view showing a third turn of coil 5 according to the first exemplary embodiment. Note that turns other than the third turn of coil 5 are not shown in FIG. 3 for the sake of convenience of description. Note that in the following description, a part wound from the tip end of lead-out part 5c to a position below a position at which lead-out part 5d is provided is defined as the first turn; and in the subsequent turns, each part wound by one turn is defined, in order, as the second turn to the fifth turn. A starting point of each turn can be arbitrarily defined. The side on which the first turn of coil 5 is provided is referred to as "lower side", and the side on which the fifth turn is provided is referred to as "upper side". Further, coil 5 applies to coils U11 to U41, V12 to V42, and W11 to W41 attached on teeth 42 of motor 1 shown in FIG. 1C.

Coil 5 has: wound conductive wire 5a; insulating film 5b (insulating layer); lead-out parts 5c, 5d; and insulating members 6 provided between individual turns of coil 5. Insulating film 5b is provided on a surface of conductive wire 5a. Lead-out parts 5c, 5d respectively extend on an outer peripheral side of coil 5 from the first turn and the fifth turn of coil 5. Insulating members 6 are provided between neighboring turns of coil 5. Each of the second turn to the fifth turn of coil 5 is wound in a rectangular shape and is constituted by four coil sides when viewed from above.

Conductive wire 5a is a wire material made of a conductive member having a quadrangular cross-section. Conductive wire 5a is wound in a spiral shape in five turns of a single layer, and constitutes a series of turns stacked in a vertical direction. Conductive wire 5a is formed of, for example, copper, aluminum, zinc, magnesium, brass, iron, steel use stainless (SUS), or the like.

Insulating film 5b insulates between coil 5 and external members, for example, stator core 41, teeth 42, and the like shown in FIG. 1C. Insulating film 5b is provided on an entire surface of conductive wire 5a so as to insulate between neighboring turns of coil 5. A thickness of insulating film 5b is about several ten microns, for example, in a range from 20 microns to 50 microns. Insulating film 5b is formed of, for example, enamel, resin, or the like.

Each of lead-out parts 5c, 5d is a part of conductive wire 5a. Lead-out parts 5c, 5d extend on the outer peripheral side of coil 5 to receive supply of current from outside or to supply current to outside. Insulating film 5b on lead-out parts 5c, 5d is removed to connect to an external member, for example, any one of bus bars 51 to 54 shown in FIGS. 1A to 1C. Insulating film 5b does not have to be removed in an entire area of each of lead-out parts 5c, 5d, and, for example, it is enough that insulating film 5b only on parts necessary for connection to bus bars 51 to 54.

Recessed parts 5e are provided in an upper surface of each turn of coil 5. Recessed parts 5e are positioning parts to be used to position when insulating members 6 are disposed on the upper surface of each turn of coil 5. In FIG. 2, recessed parts 5e are shown for the sake of convenience of description, but actually, in recessed parts 5e there are provided insulating members 6.

Insulating members 6 maintain a gap between neighboring turns of coil 5 at a predetermined distance. Insulating members 6 insulate between neighboring turns of coil 5. Insulating members 6 are formed of, for example, polyimide resin, polyamide resin, or the like. As shown in FIGS. 2 and 3, insulating members 6 are substantially circular when viewed from above. The heights of insulating members 6 from the upper surface of each turn of coil 5 is about several hundred microns, for example, in a range from 100 microns to 1 millimeter.

Not shown in the drawing, but on each upper surface of the first turn to the fifth turn of coil 5 and along the winding direction of each turn there are arranged a plurality of recessed parts 5e for positioning each corresponding to each of the plurality of insulating members 6. Insulating members 6 and recessed parts 5e are disposed apart from each other in the winding direction of each turn. Note that in a similar manner, a plurality of insulating members 6 and a corresponding plurality of recessed parts 5e for positioning may be provided also on a lower surface of the first turn of coil 5. That is, the insulating members 6 are partially disposed on either the upper surface or the lower surface of the i-th turn, where i is an integer satisfying $1 \le i \le 6$. Insulating members 6 play a role to maintain gaps between the i-th turn and the turn adjacent to the i-th turn at a predetermined distance and to insulate between the turns.

[How to Form Insulating Members]

Figure 4:
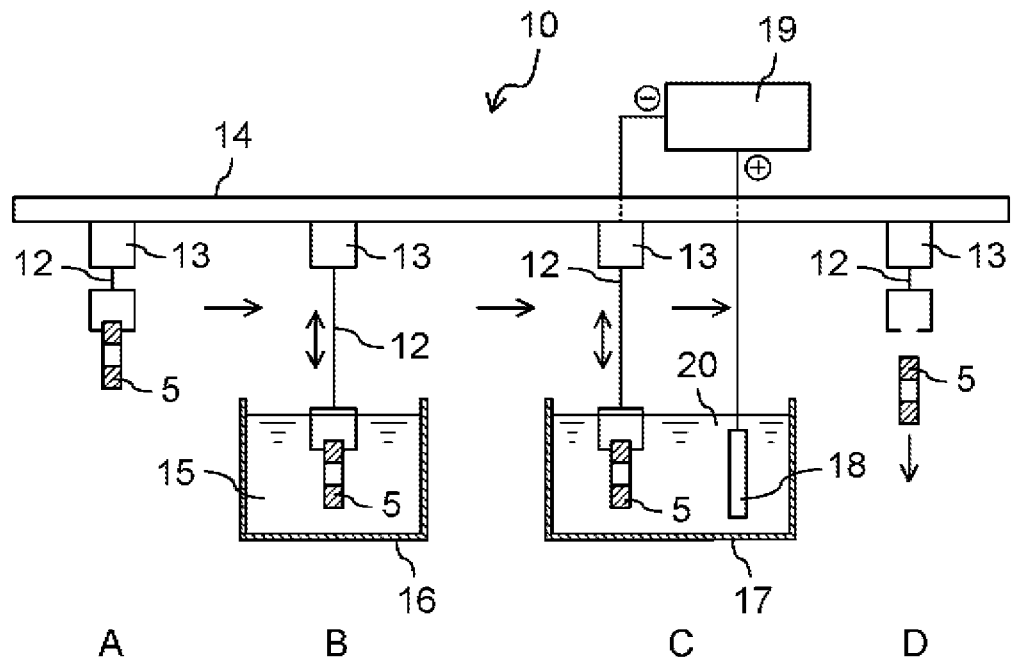
FIG. 4 is a diagram illustrating how to form an insulating member of the coil according to the first exemplary embodiment.

FIG. 4 is a diagram illustrating how to form insulating members 6 of coil 5 according to the first exemplary embodiment. Electrodeposition coating device 10 includes electrode member 12, transfer head 13, and transfer conveyer 14. To electrode member 12 is attached coil 5, which is an object to be coated. To transfer head 13 is attached electrode member 12 in a vertically movable manner. Transfer conveyer 14 transfers transfer head 13. Further, electrodeposition coating device 10 includes: pretreatment tank 16; electrodeposition tank 17; power supply unit 19 including a direct-current power supply and the like; and counter electrode 18 connected to power supply unit 19 and contained in electrodeposition tank 17. In pretreatment tank 16 is stored aqueous solution 15 that has a smaller surface tension than purified water. In electrodeposition tank 17 is stored electrodeposition coating liquid 20.

In step A, electrode member 12 attached with coil 5 is attached to transfer head 13, and transfer conveyer 14 is activated to transfer head 13 to pretreatment tank 16. Not shown in the drawing, but coil 5 has no insulating film 5b in recessed parts 5e or in the vicinity of recessed parts 5e, and conductive wire 5a is therefore exposed.

In step B, coil 5 is immersed in aqueous solution 15 in pretreatment tank 16 to perform a pretreatment before coating.

In step C, transfer head 13 attached with coil 5 is transferred again, and coil 5 is immersed in electrodeposition coating liquid 20 in electrodeposition tank 17 while coil 5 is being supported by electrode member 12. Electrodeposition coating liquid 20 is a known electrodeposition liquid containing an appropriate resin component such as polyimide resin, polyamide resin, epoxy resin, polyamide-imide resin, or polycarboxylic acid resin. By applying a voltage from power supply unit 19 to counter electrode 18 to flow current between electrode member 12 and counter electrode 18, coil 5 is electrodeposition coated. In this step, in the case of cation electrodeposition coating, a predetermined voltage is applied to perform the electrodeposition coating in such a manner that the side of coil 5, which is an object to be coated, is negative and the side of counter electrode 18 is positive. In the case of anion electrodeposition coating, the electrodeposition coating is performed with a predetermined voltage in the opposite polarity to that in the above case being applied. Before the electrodeposition coating, insulating film 5b is subjected to baking or other processing to become a stable film.

In step D, transfer head 13 attached with coil 5 is transferred again, and coil 5 is removed from electrode member 12.

Note that after completion of step D, coil 5, which is an object to be coated, is subjected to water washing, drying, baking of the coating film, or other processing as needed, so that coil 5 becomes a final coated article. For example, in the case of anion electrodeposition coating, a part near the anode on the side of coil 5, which is an object to be coated, becomes acid, and acrylic resin having a carboxyl group may be aggregated and deposited in some cases. In the case of cation electrodeposition coating, a part near the cathode on the coil 5 side becomes alkalic, and melamine resin having an amino group, for example, epoxy resin, acrylic resin, or the like is deposited. When these resins are baked, a coating film, that is, insulating member 6 in the case of the present exemplary embodiment becomes a strong coating film. Note that a temperature at the time of baking is about 150° C., but the temperature can be changed depending on a type of the coating film or the like. Note that, as will be described later, a forming method of insulating member 6 is not limited to the above method, and other methods can be appropriately used.

[Effect]

In the present exemplary embodiment, insulating members 6 maintain gaps between neighboring turns of coil 5 at a predetermined distance. Therefore, insulation between neighboring turns of coil 5 can be secured. As a result, the withstand voltage of coil 5 can be maintained. Further, in the case where insulating film 5b is provided on an entire surface of conductive wire 5a, insulating film 5b is not in contact with insulating film 5b itself between neighboring turns. Therefore, insulating film 5b is prevented from being damaged or from falling off, and occurrence of insulation defect can therefore be prevented or reduces. In particular, if the height of insulating member 6 is sufficiently greater than the thickness of insulating film 5b, insulation between neighboring turns of coil 5 can be surely secured. This enables the withstand voltage to be maintained, for example, in motor 1 shown in FIGS. 1A to 1C for a long period of time. Therefore, reliability of motor 1 can be improved.

Further, since insulating members 6 are partially provided between neighboring turns of coil 5, it is possible to hold a part between neighboring turns of coil 5 with a jig, a robot arm, or the like. This makes it easy to handle coil 5. For example, in the case of motor 1 shown in FIGS. 1A to 1C, it is easy to attach coils 5 to teeth 42 of motor 1. Further, in a case where the inside of motor 1 is cooled with cooling medium, insulating members 6 provide a gap between neighboring turns of coil 5 at a predetermined distance. Therefore, the cooling medium can easily flows between the individual turns, and cooling efficiency of coil 5 can be accordingly improved. This improves efficiency of motor 1.

In addition, coil 5 according to the present exemplary embodiment has predetermined stiffness and is less bendable and less stretchable compared with normal rectangular coils. This enables insulating members 6 provided between neighboring turns of coil 5 to be surely held by coil 5.

Figure 5:
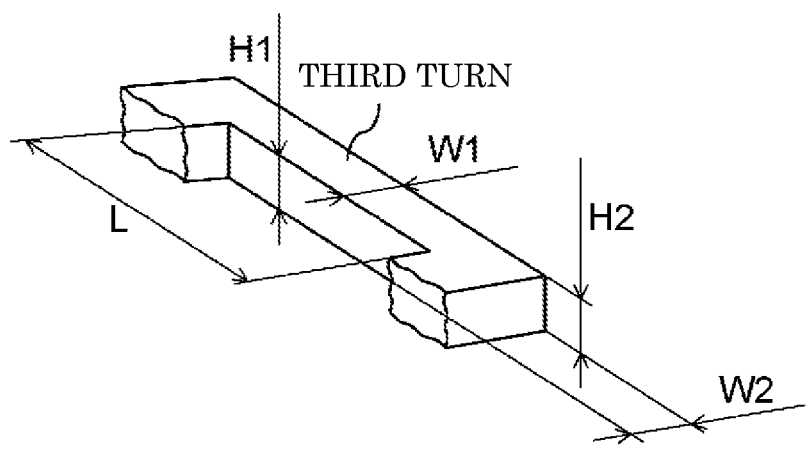
FIG. 5 is an enlarged perspective view showing an area surrounded by the dashed-dotted line in FIG. 3.

FIG. 5 is an enlarged perspective view showing area A surrounded by the dashed-dotted line in FIG. 3. Note that in FIG. 5, recessed parts 5e and insulating members 6 are not shown for the sake of convenience of description.

In a case where conductive wire 5a has a rectangular cross-section, an index G related to stiffness of the i-th turn of coil 5 is represented by Equation 1 by using the dimensions shown in FIG. 5.

$$G = L/(W1+W2+H1+H2) \quad \text{(Equation 1)}$$

where W1 is a width on an upper surface side at the third turn, W2 is a width on a lower surface side at the third turn, H1 is a thickness on an inner peripheral side at the third turn, H2 is a thickness on an outer peripheral side at the third turn, and L is a length, of one coil side at the third turn, on the inner peripheral side.

Note that Equation 1 applies also to the turns of coil 5 other than the third turn, in other words, the i-th turn in a similar manner.

The right side of Equation 1 represents a ratio of a length of one side at the i-th turn of coil 5 to a perimeter of a polygonal cross-section of the i-th turn of coil 5. Generally, the smaller the index G is, the less bendable and less stretchable coil 5 is. That is, if coil 5 is deformed by applying an external force, resilience of coil 5 acts stronger between neighboring turns of coil 5.

In the case of coil 5 according to the present exemplary embodiment, the following relationship holds.

$$4 < L/(W1+W2+H1+H2) < 22.3 \quad \text{(Equation 2)}$$

Coil 5 is less bendable and less stretchable than general rectangular coils. This enables the resilience of coil 5 to surely hold insulating members 6 between the turns of coil 5, so that insulation between the turns can be secured.

In the present exemplary embodiment, the number of turns of coil 5 is five. However, the number of turns is not particularly limited to the above figure, and the number of turns of coil 5 may be another value.

In the present exemplary embodiment, recessed parts 5e for positioning insulating members 6 are provided on coil 5; however, recessed parts 5e do not have to be provided.

Recessed parts 5e and insulating members 6 are provided on the upper surfaces of the first turn to the fifth turn of coil 5; however, recessed parts 5e and insulating members 6 may be provided on the lower surfaces of the first turn to the fifth turn of coil 5.

The shape of insulating members 6 may be a quadrangular shape or other shapes when viewed from above. Regarding coil 5, it is preferable that Equation 2 holds. Also in a case of conductive wire 5a who has a polygonal cross-section instead of a quadrangular shape as shown in FIG. 5, if a material at the same stiffness level as represented by Equation 2 is used, coil 5 can be formed to be less bendable and less stretchable. Note that even in a case where the relationship represented by Equation 2 does not hold, if insulating members 6 are disposed between neighboring turns of coil 5, the gaps between neighboring turns of coil 5 can be maintained at a predetermined distance, and insulation between the turns can be secured.

As described above, coil 5 of the present exemplary embodiment includes: a series of turns constituted by a first turn to an n-th turn of conductive wire 5a having a polygonal cross-section, where n is an integer equal to or larger than 3, and the conductive wire is wound in a spiral shape and is stacked in a direction from downward toward upward; and insulating member 6 partially disposed on either an upper surface or a lower surface of an i-th turn, where i is an integer satisfying $1 \leq i \leq n$.

This configuration can ensure insulation between neighboring turns of coil 5.

First Modified Example

Figure 6A:
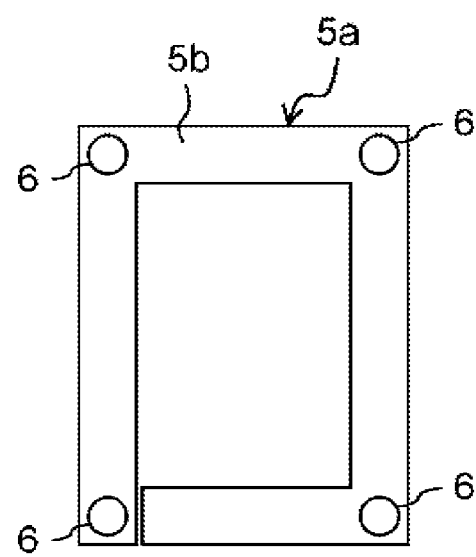
FIG. 6A is an upper surface view showing a third turn of a coil according to a first modified example.
Figure 6B:
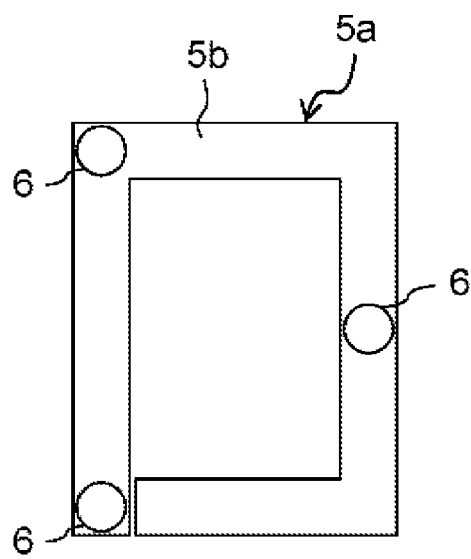
FIG. 6B is an upper surface view of another third turn of the coil according to the first modified example.

FIG. 6A is an upper surface view of a third turn of coil 5 according to a first modified example. FIG. 6B is an upper surface view of another third turn of coil 5 according to the first modified example. Note that turns other than the third turn of coil 5 are not shown in FIG. 6A or 6B for the sake of convenience of description.

In coil 5, insulating members 6 only have to be provided in such a manner that gaps between neighboring turns are maintained at a predetermined distance and insulation between neighboring turns is secured. For example, as shown in FIG. 6A, insulating members 6 may be provided only at four corners of each turn of coil 5. As shown in FIG. 6B, insulating member 6 may be provided at each of two corners of each turn of coil 5 and a point near a midpoint of a coil side facing the two corners. In this case, because each of insulating members 6 are disposed at each apex of a triangular shape when viewed from above, insulating members 6 can maintain the gaps between neighboring turns of coil 5 at a predetermined distance. In the present modified example, insulating members 6 are formed into a predetermined shape, for example, a substantially hemispheric shape by using a solid insulating material such as cross-linked polyethylene, epoxy resin, vinyl chloride, or synthetic rubber, and are then disposed at predetermined positions shown in FIGS. 6A and 6B. Further, instead of the forming method of insulating members 6 shown in FIG. 4, the above method may be used to dispose insulating members 6 for the configuration shown in the first exemplary embodiment. This method does not need a patterning process of insulating film 5b, and the manufacturing process can be therefore simplified. In the case of using this forming method, insulating members 6 may be provided on the surface of insulating film 5b provided on the surface of conductive wire 5a. Note that the arrangements of insulating members 6 shown in FIG. 3 and FIGS. 6A and 6B are just examples. The arrangement positions, size, number, and shape of insulating members 6 can be appropriately changed.

Second Exemplary Embodiment

Figure 7:
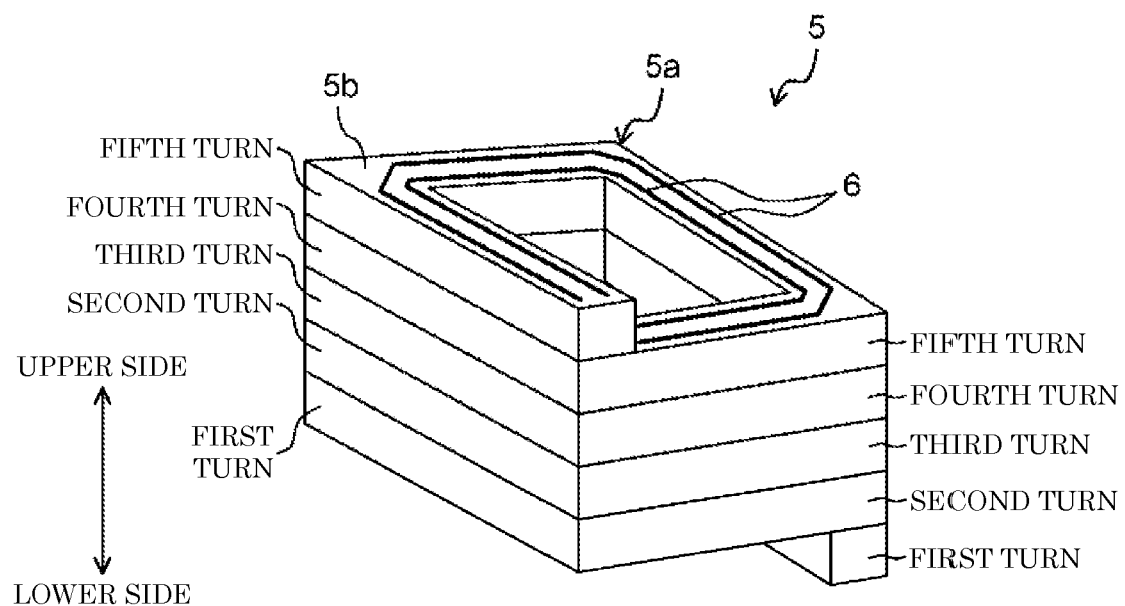
FIG. 7 is a perspective view showing a coil according to a second exemplary embodiment.
Figure 8:
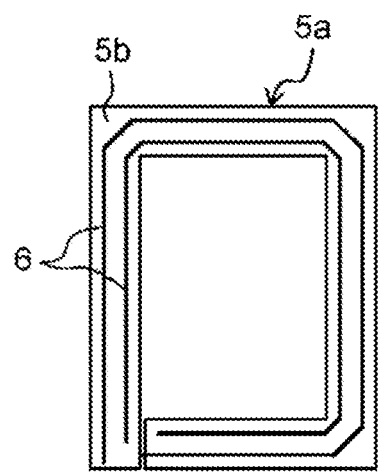
FIG. 8 is an upper surface view showing a third turn of the coil according to the second exemplary embodiment.

FIG. 7 is a perspective view showing coil 5 according to a second exemplary embodiment. FIG. 8 is an upper surface view showing a third turn of coil 5 according to the second exemplary embodiment. Note that in FIG. 7, lead-out parts 5c, 5d are not shown for the sake of convenience of description. In FIG. 8, turns other than the third turn of coil 5 are not shown. As shown in FIGS. 7 and 8, two insulating members 6 are provided along the winding direction of coil 5. Each insulating member 6 continuously extends in a line shape. Insulating members 6 are disposed substantially parallel to each other.

In the present exemplary embodiment, after thermosetting resin or ultraviolet-curing resin is applied between neighboring turns of coil 5 by using a tube or the like, the resin is cured to form insulating members 6. In a case where coil 5 continues in a spiral shape and conductive wire 5a is less deformable, it is difficult, for example, to previously form a pattern for electrodeposition coating on insulating film 5b as shown in FIG. 4 and to insert, between neighboring turns of coil 5, insulating member 6 previously formed in a predetermined shape as shown in the first modified example. In such a case, a nozzle is inserted between neighboring turns of coil 5, and thermosetting resin or the like is discharged from the nozzle to form a line-shaped pattern made of resin or the like on the upper surface or the lower surface of conductive wire 5a, for example. In this way, insulating member 6 can be easily disposed entirely in the winding direction of conductive wire 5a. As a result, the manufacturing process can be simplified. If this method is used, insulating member 6 may be provided on the surface of insulating film 5b provided on the surface of conductive wire 5a.

In the present exemplary embodiment, recessed parts 5e for positioning insulating members 6 shown in FIG. 2 are not provided; however, recessed parts 5e may be provided. In such a case, recessed parts 5e may be formed to be line-shaped grooves extending along the winding direction of coil 5. In the above-described example, insulating members 6 are provided on the upper surfaces of the first turn to the fifth turn of coil 5. However, insulating members 6 may be provided on the lower surface of the first turn to the fifth turn of coil 5.

Second Modified Example

Figure 9A:
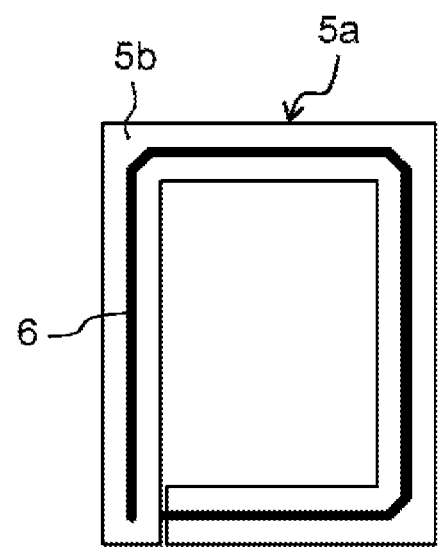
FIG. 9A is an upper surface view showing a third turn of a coil according to a second modified example.
Figure 9B:
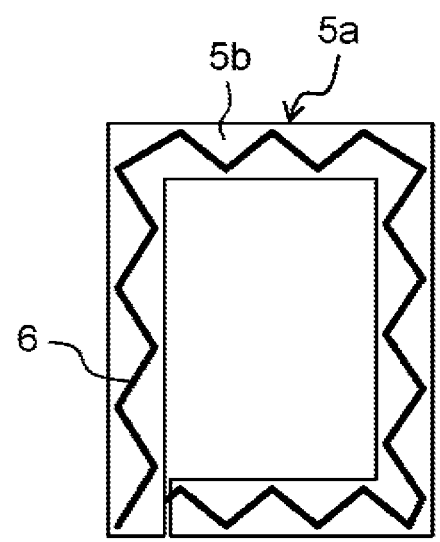
FIG. 9B is another upper surface view showing the third turn of the coil according to the second modified example.

FIG. 9A is an upper surface view of a third turn of a coil according to a second modified example. FIG. 9B is an upper surface view of another third turn of the coil according to the second modified example. Note that turns other than the third turn of coil 5 are not shown in FIG. 9A or 9B for the sake of convenience of description.

In coil 5, insulating members 6 only have to be provided in such a manner that the gaps between neighboring turns are maintained at a predetermined distance and insulation between neighboring turns is secured. For example, as shown in FIG. 9A, one insulating member 6 may be provided in a line shape along the winding direction of coil 5. Note that in this case, to stably maintain the gaps between the individual turns of coil 5, there is disposed insulating member 6 having a line width wider than the line width of insulating members 6 shown in FIG. 8, for example. As shown in FIG. 9B, insulating member 6 may be disposed along the winding direction of each turn of coil 5 and in a zig-zag manner. In this case, insulating member 6 is provided over a predetermined length also in a width direction of the turn of coil 5. Therefore, the gaps between the individual turns of coil 5 can be maintained at a predetermined distance. Note that the disposition of insulating members 6 shown in FIG. 8 and FIGS. 9A and 9B are just examples. The arrangement positions, line width, height, and number of insulating members 6 can be appropriately changed.

Third Exemplary Embodiment

Figure 10:
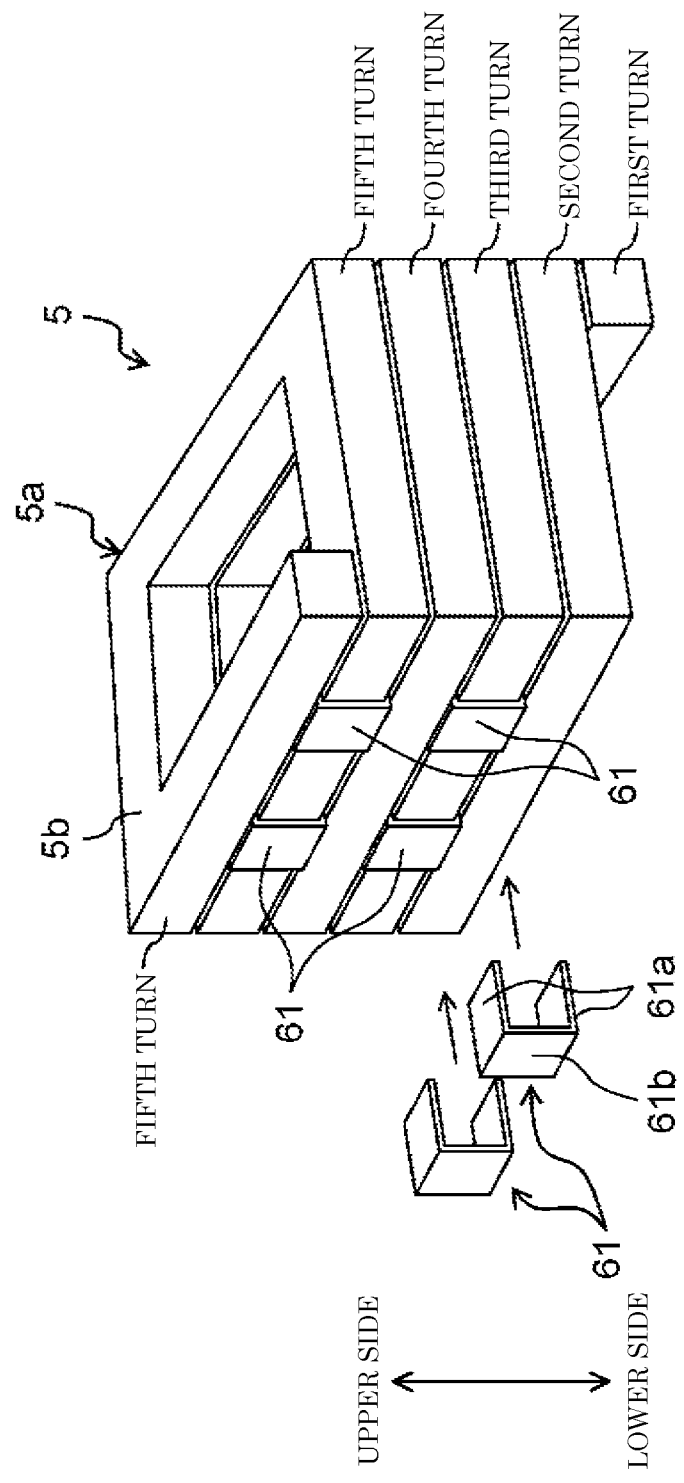
FIG. 10 is a perspective view showing a coil according to a third exemplary embodiment.
Figure 11:
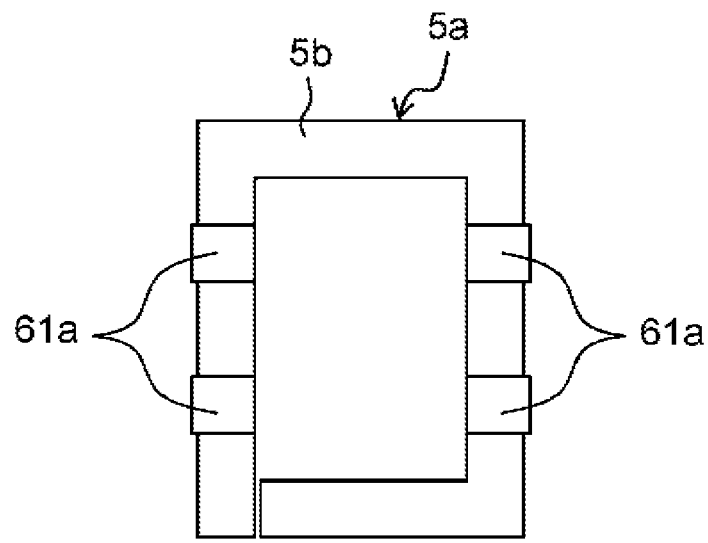
FIG. 11 is an upper surface view showing a third turn of the coil according to the third exemplary embodiment.

FIG. 10 is a perspective view showing coil 5 according to a third exemplary embodiment. FIG. 11 is an upper surface view showing a third turn of coil 5 according to the third exemplary embodiment. Note that in FIG. 10, lead-out parts 5c, 5d are not shown for the sake of convenience of description. In FIG. 11, turns other than the third turn of coil 5 are not shown. FIG. 10 shows coil 5 before and after insulating members 61 are attached to coil 5.

In the present exemplary embodiment insulating members 61 are not previously provided on the upper surface or the lower surface of each turn of coil 5 but are provided to intervene between neighboring turns of coil 5 having been wound. Insulating member 61 is a substantially U-shaped insulating member in which intervening part 61a is coupled at each of an upper end and a lower end of coupler 61b. Insulating member 61 is formed of, for example, resin, insulating paper, a resin-impregnated insulating sheet, or the like.

Insulating member 61 is disposed to be sandwiched between three consecutive turns of coil 5. For example, insulating member 61 is disposed as shown in FIG. 10 in the following manner. Intervening part 61a coupled to the upper end of coupler 61b intervenes between the fourth turn and the fifth turn of coil 5, coupler 61b extends passing over an outer peripheral side of the fourth turn of coil 5, and intervening part 61a coupled to the lower end of coupler 61b intervenes between the third turn and the fourth turn of coil 5. Further, insulating member 61 is disposed in the following manner. Intervening part 61a coupled to the upper end of coupler 61b intervenes between the second turn and the third turn of coil 5, coupler 61b extends passing over an outer peripheral side of the second turn of coil 5, and intervening part 61a coupled to the lower end of coupler 61b intervenes between the first turn and the second turn of coil 5. Further, as shown in FIGS. 10 and 11, between neighboring turns, the intervening part of insulating member 61 is disposed at two places on one coil side, and in addition, the intervening part of insulating member 61 is disposed at two places also on another coil side that faces the one coil side. Note that FIG. 10 does not show insulating members 61 disposed on the facing coil side. Further, not shown in FIG. 10, but intervening part 61a may be disposed on the upper surface of the fifth turn and the first lower surface. Further, intervening parts 61a of insulating member 61 is fixed to individual turns of coil 5 with, for example, an adhesive or the like.

According to the present exemplary embodiment, intervening parts 61a of insulating members 61 are disposed to intervene between neighboring turns of coil 5; therefore, the process for disposing insulating members 61 in coil 5 is simplified. In particular, there is no need for directly providing insulating members 6 on the upper surface and the lower surface of each turn, and it is therefore not necessary to form recessed parts 5e shown in FIG. 2, in the upper surface or the lower surface of each turn of coil 5, for example. Further, it is easy to set the positions where insulating members 61 intervene, and manufacturing cost can be accordingly reduced.

Note that in the present exemplary embodiment, intervening parts 61a of each insulating member 61 are separately disposed to intervene between three consecutive turns; however, the present invention is not particularly limited to this configuration. For example, intervening part 61a coupled to the upper end of coupler 61b intervenes between the fourth turn and the fifth turn of coil 5, intervening part 61a coupled to the lower end of coupler 61b intervenes between the first turn and the second turn of coil 5, and coupler 61b extends passing over an outer peripheral side of the third turn to the fifth turn of coil 5. That is, insulating member 61 only has to include: intervening parts 61a each provided to intervene between the i-th turn and a turn adjacent to the i-th turn and between a j-th turn and a turn adjacent to the j-th turn, where j is an integer satisfying $1 \leq j \leq n$ and $i \neq j$; and coupler 61b to couple intervening parts 61a to each other on an outer peripheral side of conductive wire 5a.

Third Modified Example

Figure 12A:
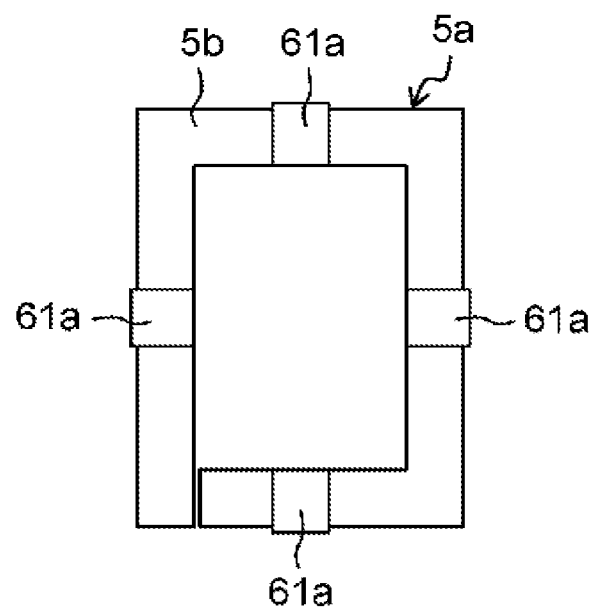
FIG. 12A is an upper surface view showing a third turn of a coil according to a third modified example.
Figure 12B:
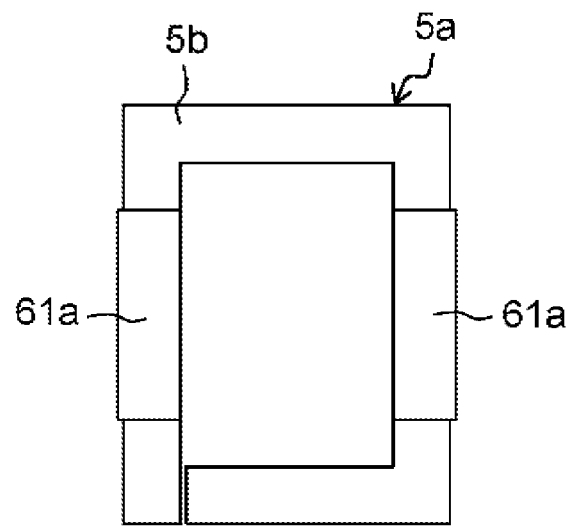
FIG. 12B is an upper surface view of another third turn of the coil according to the third modified example.
Figure 12C:
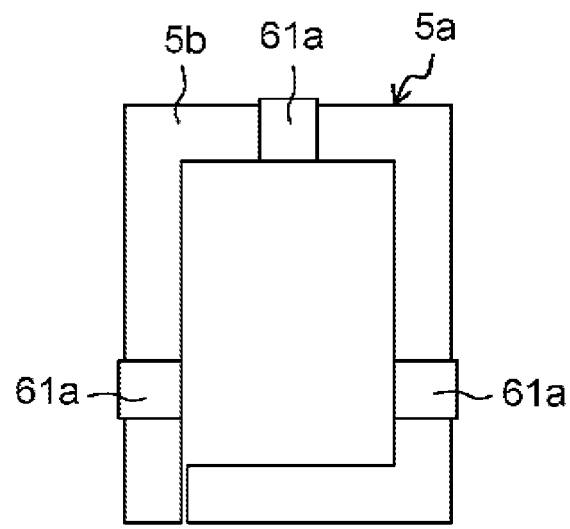
FIG. 12C is an upper surface view of still another third turn of the coil according to the third modified example.

FIG. 12A is an upper surface view of a third turn of coil 5 according to a third modified example. FIG. 12B is an upper surface view of another third turn of coil 5 according to the third modified example. FIG. 12C is an upper surface view of still another third turn of coil 5 according to the third modified example. Note that turns other than the third turn of coil 5 are not shown in any of FIGS. 12A to 12C for the sake of convenience of description.

In coil 5, insulating members 61 only have to be provided in such a manner that gaps between neighboring turns are maintained at a predetermined distance and insulation between neighboring turns is secured. For example, as shown in FIG. 12A, intervening part 61a of insulating member 61 may be disposed on all of the four coil sides of each turn of coil 5. In this case, by disposing insulating member 61 in the vicinity of the midpoint of each coil side, it is possible to maintain the gaps between neighboring turns of coil 5 at a predetermined distance.

Alternatively, as shown in FIG. 12B, insulating member 61 may be disposed only each of two facing coil side at each turn of coil 5. Note that in this case, to stably maintain the gaps between neighboring turns of coil 5, a width of intervening part 61a of each insulating member 61 is made wider than the widths shown in FIGS. 11 and 12A, for example. As shown in FIG. 12C, insulating member 61 may be provided at each of the vicinities of two corners of each turn of coil 5 and at a position near a midpoint of a coil side facing these vicinities. In this case, insulating members 61 are each disposed at each apex of a triangular shape when viewed from above. This arrangement enables the gaps between neighboring turns of coil 5 to be maintained at a predetermined distance. Note that the arrangements of insulating members 61 shown in FIG. 11 and FIGS. 12A to 12C are each just an example, and the arrangement positions of insulating members 61, a width and thickness of intervening part 61a, a disposition number of insulating members 61, or the like can be appropriately changed.

Fourth Modified Example

Figure 13:
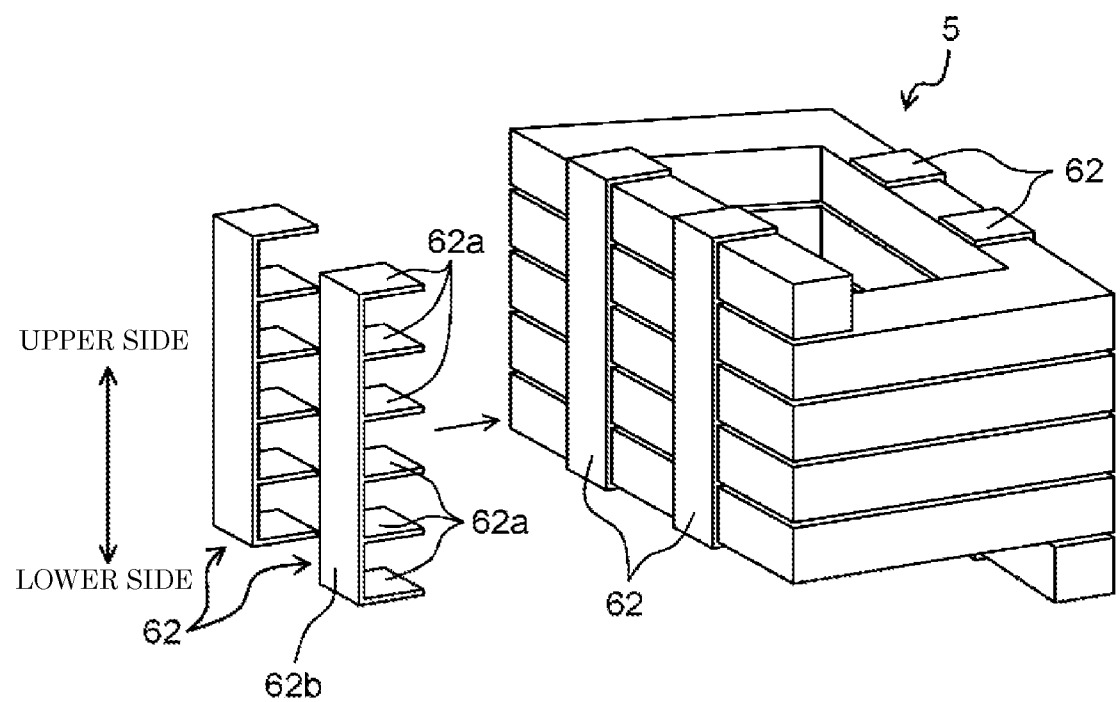
FIG. 13 is a perspective view showing a coil according to a fourth modified example.

FIG. 13 is a perspective view showing coil 5 according to a fourth modified example. Note that in FIG. 13, lead-out parts 5c, 5d are not shown for the sake of convenience of description. Further, FIG. 13 shows coil 5 before and after insulating members 62 are attached to coil 5.

The difference between the configuration according to the present modified example and the configuration according to the second exemplary embodiment is in the shape of the insulating member. Insulating member 62 according to the present modified example is an insulating member in which intervening parts 62a are coupled to coupler 62b in the vertical direction at predetermined intervals. That is, intervening parts 62a of insulating member 62 each extend from between every turn of coil 5 and are coupled to each other by coupler 62b on the outer peripheral side of the individual turns of coil 5. Note that intervening part 62a is disposed also on the upper surface of the fifth turn and on the lower surface of the first turn.

A distance between intervening parts 62a neighboring in the vertical direction is substantially equal to the sum of the thickness of conductive wire 5a of coil 5 and the value of twice the thickness of insulating film 5b provided on the surface of conductive wire 5a. Here, the expression "substantially equal" means to be equal including machining tolerances of conductive wire 5a and insulating film 5b of coil 5 and including a machining tolerance of insulating member 62 containing intervening parts 62a. In the case where insulating film 5b is not provided on the surface of conductive wire 5a, the distance between intervening parts 62a neighboring in the vertical direction is substantially equal to the thickness of conductive wire 5a. Intervening parts 62a of insulating member 62 are fixed to individual turns of coil 5 with, for example, an adhesive or the like.

According to the present modified example, the number of insulating members to be attached to coil 5 is smaller than that in the configuration shown in the third exemplary embodiment. Therefore, a process for attaching insulating members 62 to coil 5 can be further simplified. Accordingly, it is possible to further reduce material cost and manufacturing cost.

Note that the arrangement of insulating members 62 is not particularly limited to the configuration shown in FIG. 13, and insulating members 62 may be disposed, for example, as shown in FIGS. 12A to 12C. Note that the above arrangements of insulating members 62 are each just an example, and the arrangement positions of insulating members 62, a width of intervening part 62a, a thickness of intervening part 62a, a disposition number of insulating members 62, or the like can be appropriately changed.

Fifth Modified Example

Figure 14:
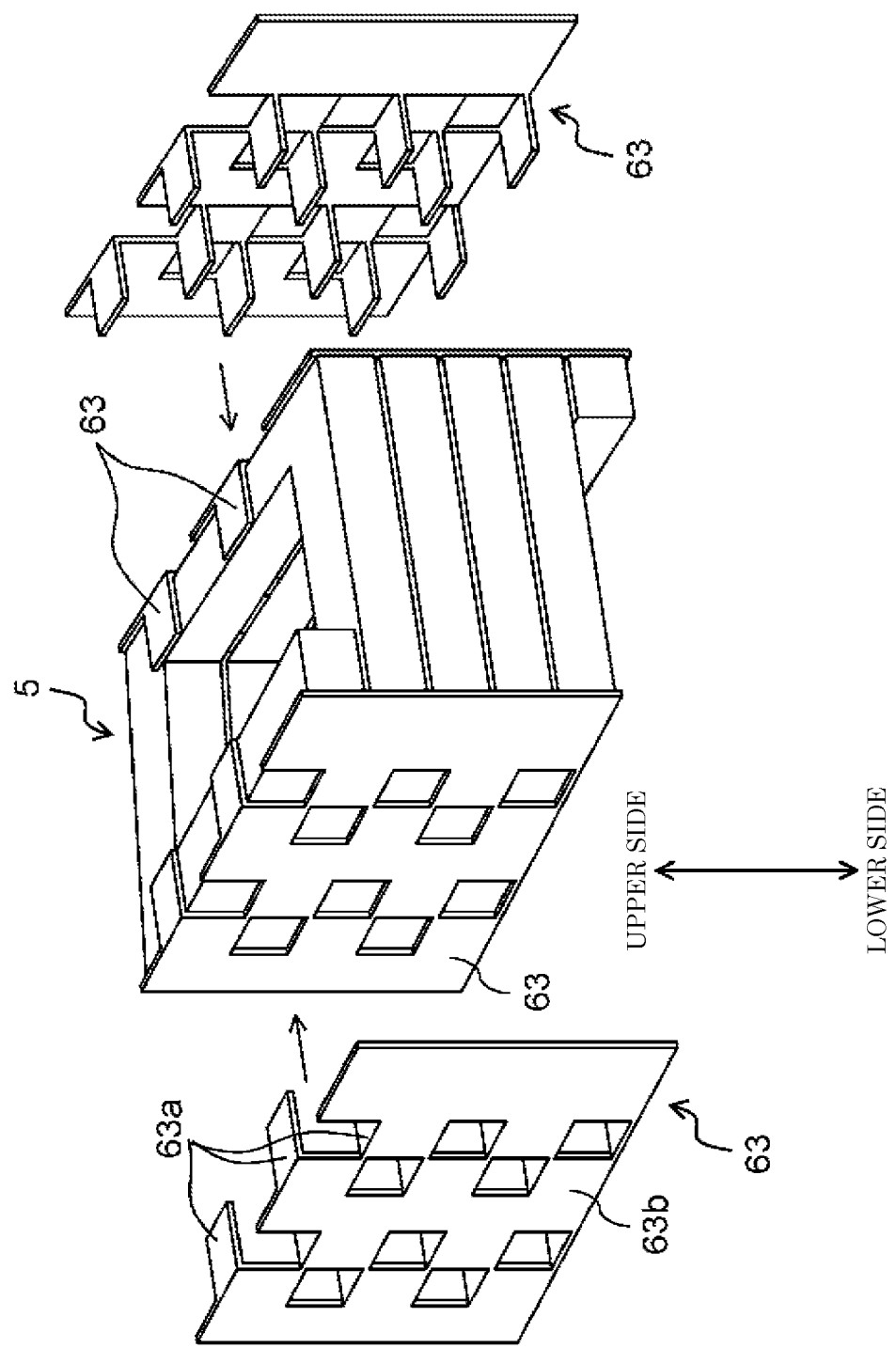
FIG. 14 is a perspective view showing a coil according to a fifth modified example.

FIG. 14 is a perspective view showing coil 5 according to a fifth modified example. Note that in FIG. 14, lead-out parts 5c, 5d are not shown for the sake of convenience of description. Further, FIG. 14 shows coil 5 before and after insulating members 63 are attached to coil 5.

The large differences between the configuration according to the present modified example and the configurations according the second exemplary embodiment and the fourth modified example are in the shape of the insulating member. In insulating member 63 according to the present modified example, intervening parts 63a are coupled to coupler 63b two-dimensionally and apart from each other. Intervening parts 63a of insulating member 63 each extend from between every turn of coil 5 and are coupled to each other by coupler 63b on the outer peripheral side of the individual turns of coil 5. Note that intervening parts 63a are disposed also on the upper surface of coil 5, in other words, the upper surface of the fifth turn and on the lower surface of coil 5, in other words, on the lower surface of the first turn of coil 5.

A distance between intervening parts 63a neighboring in the vertical direction is substantially equal to the sum of the thickness of conductive wire 5a of coil 5 and the value of twice the thickness of insulating film 5b provided on the surface of conductive wire 5a. Here, the expression "substantially equal" means to be equal including machining tolerances of conductive wire 5a and insulating film 5b of coil 5 and including a machining tolerance of insulating member 63 containing intervening parts 63a. In the case where insulating film 5b is not provided on the surface of conductive wire 5a, the distance between intervening parts 63a neighboring in the vertical direction is substantially equal to the thickness of conductive wire 5a.

Further, intervening parts 63a disposed in a direction intersecting the vertical direction are disposed in such a manner that intervening parts 63a are disposed at four places in each space between neighboring turns of coil 5. Specifically, two intervening parts 63a are on one coil side, and two intervening parts 63a are on another coil side that faces the one coil side. Further, each insulating member 63 is disposed on each of the facing surfaces of the four side surfaces of coil 5. When viewed from a side surface of coil 5, insulating member 63 entirely covers the side surface of coil 5 and has substantially the same size as the side surface. Here, the expression "substantially the same" means to be the same including a machining tolerance of coil 5 and a machining tolerance of insulating members 63. Intervening parts 63a of insulating member 63 are fixed to individual turns of coil 5 with, for example, an adhesive or the like.

According to the present modified example, similarly to the case of the configuration shown in the fourth modified example, a large number of insulating members are not required. Accordingly, manufacturing cost can be reduced. In addition, since coupler 63b of insulating member 63 is disposed covering the side surface of coil 5, insulation between coil 5 and members adjacent to coil 5 can be secured. For example, if all of the four side surfaces of coil 5 are each attached with insulating member 63, there is no need for providing an insulating member between coils 5 and each of stator core 41 and teeth 42 or between neighboring coils in motor 1 shown in FIGS. 1A to 1C. As a result, it is possible to reduce material cost and assembly cost. Note that depending on the arrangement of neighboring external members, insulating members 63 according to the present modified example may be provided on facing two side surfaces or on three side surfaces of coil 5.

Insulating member 63 may be formed by injection molding or the like by using resin or the like in a similar manner to insulating member 61 shown in the third exemplary embodiment and insulating member 62 shown in the fourth modified example. Alternatively, insulating member 63 may be formed of insulating paper, resin-impregnated insulating paper, or the like. In this case, if the insulating member constituting insulating member 63 has a sheet shape, for example, if the insulating member constituting insulating member 63 is an insulating paper having a predetermined thickness or other material, insulating member 63 may be made by cutting out parts of the insulating paper and subjecting the cut-out parts to bending. If insulating paper is used, insulating member 63 may be made by cutting a single sheet of insulating paper. In this case, because there in no need for using a molding die to be used for injection molding, manufacturing cost can be reduced. Note that also when intervening part 63a is made by cutting a single sheet of insulating paper at a plurality of parts and bending the cut-out parts, the distance between intervening parts 63a neighboring in the vertical direction is set substantially equal to the sum of the thickness of conductive wire 5a of coil 5 and the value of twice the thickness of insulating film 5b provided on the surface of conductive wire 5a.

Note that the arrangement of insulating members 63 shown in FIG. 14 is just an example, and the arrangement positions, size, and disposition number of insulating member 63, a width and thickness of intervening part 63a, or the like can be appropriately changed.

Note that in the first to third exemplary embodiments and the first to fifth modified examples, the descriptions have been given by using examples in which coil 5 is provided in stator 4 of motor 1. However, the techniques disclosed here are not particularly limited to the above examples and can be applied to other use, for example, for coils in generators, reactors in power instruments, and the like.

In the above configurations, the examples are shown in which insulating member 6 or any of intervening parts 61a, 62a, 63a of insulating members 61, 62, 63 is partially disposed on the upper surface and the lower surface of coil 5. However, insulating member 6 or the like may be provided on either the upper surface or the lower surface of coil 5. Alternatively, insulating member 6 or the like does not have to be provided at the above positions.

For example, in motor 1 shown in FIGS. 1A to 1C, coils 5 are disposed in slots 43, being wound on teeth 42. In this case, insulators (not shown), for example, insulating paper, are provided between coils 5 and teeth 42 and between coils 5 and stator core 41. The insulating paper secures insulation between coils 5 and these members. In the case where insulating members 6 or other members are provided on the upper surface and the lower surface of coil 5, it is possible to more surely insulate between coils 5 and stator core 41 and between coils 5 and teeth 42.

In addition, insulating film 5b provided on the surface of conductive wire 5a is not necessary. The process for forming insulating film 5b can be omitted. Accordingly, manufacturing cost can be reduced. In the case where insulating film 5b is provided on the surface of conductive wire 5a, it is possible to more surely insulate between coils 5 and external members, for example, between coils 5 and stator core 41 shown in FIG. 1C and between coils 5 and teeth 42 shown in FIG. 1C. In addition, insulation between neighboring turns of coil 5 can be further ensured.

Note that the cross-sectional shape of conductive wire 5a may be a quadrangular shape, a rectangular shape, or a trapezoid. Other than a quadrangle, a triangular shape or a pentagon may be used. Further, a polygon having sides not fewer than a pentagon may be used.

Coil 5 can be formed by metallic casting. By this method, a conductive wire having a large cross-sectional area can be easily formed into a coil wound in a spiral shape. However, the method is not limited to metallic casting, and other methods may be used for forming. For example, coil 5 may be formed by carving a solid material such as copper, aluminum, zinc, magnesium, iron, SUS, brass, or the like. Alternatively, for example, coil 5 may be formed by joining components, which are separately formed, to each other by welding or other methods.

Fourth Exemplary Embodiment

Figure 15A:
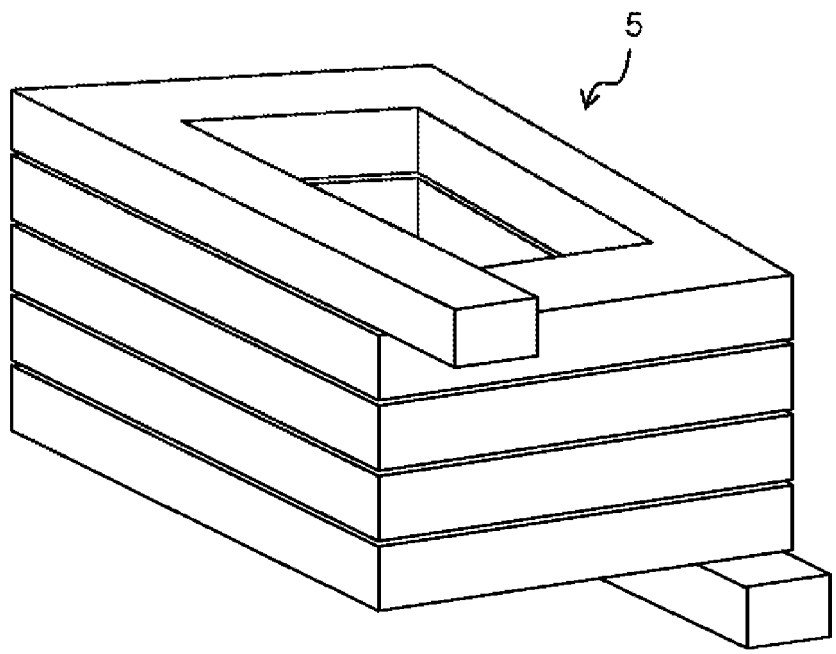
FIG. 15A is a perspective view showing a coil according to a fourth exemplary embodiment.
Figure 15B:
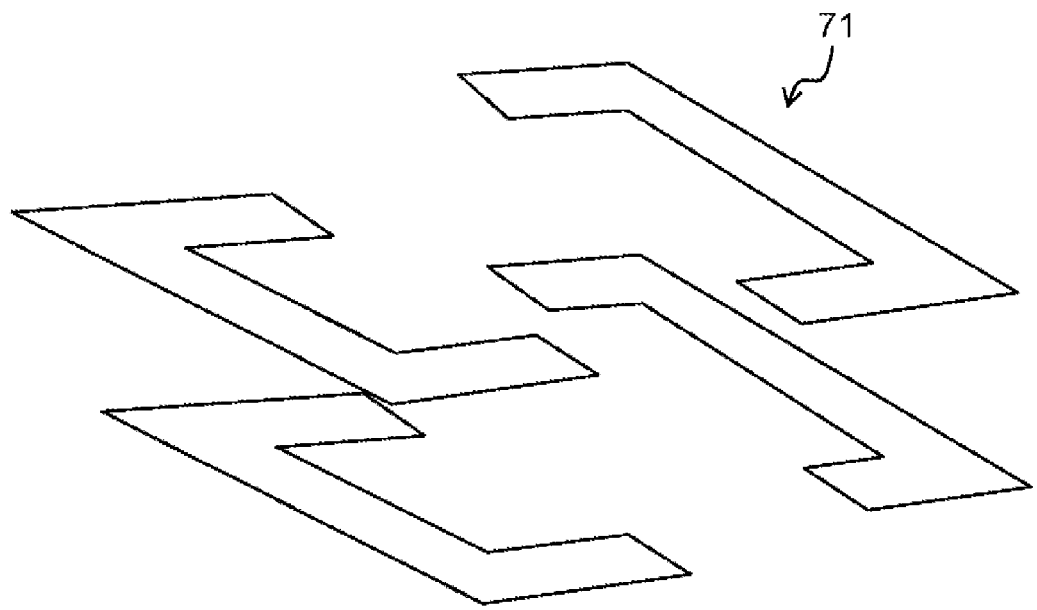
FIG. 15B is a perspective view showing insulating paper according to the fourth exemplary embodiment.
Figure 15C:
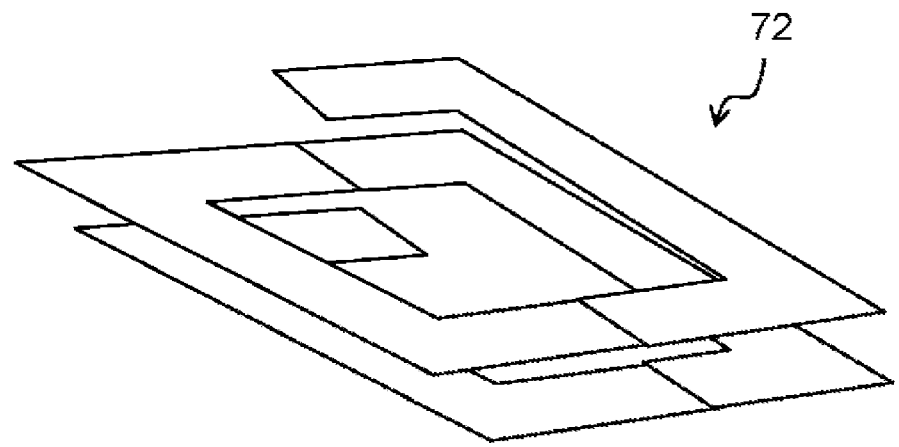
FIG. 15C is a perspective view showing the insulating paper according to the fourth exemplary embodiment.
Figure 15D:
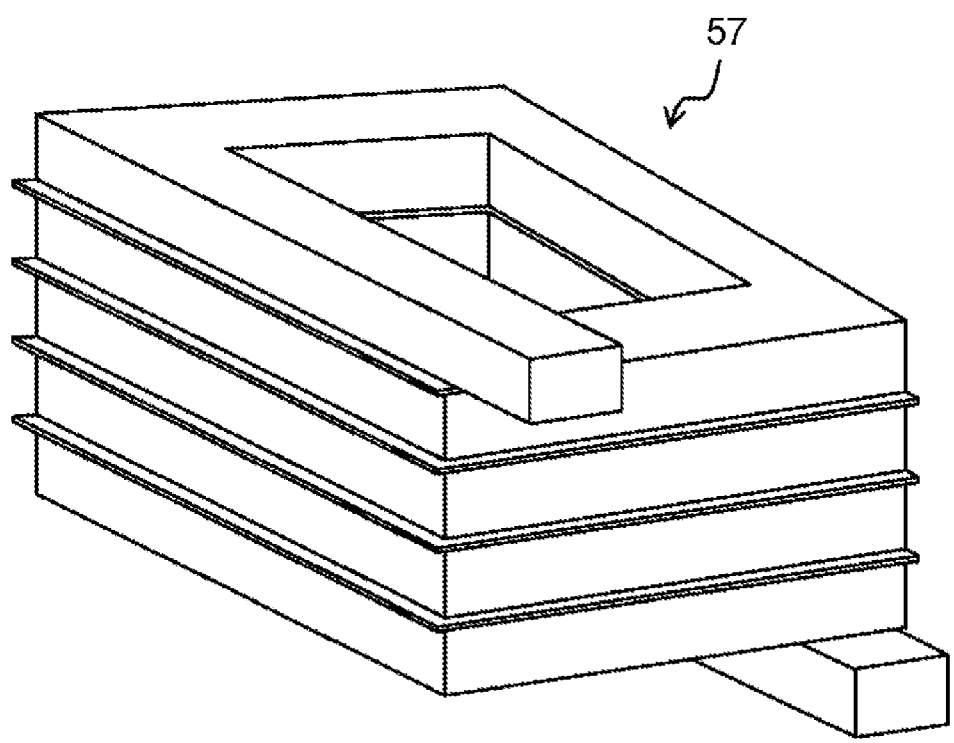
FIG. 15D is a perspective view showing the coil according to the fourth exemplary embodiment.

FIG. 15A is a perspective view showing coil 5 according to a fourth exemplary embodiment. FIG. 15B is a perspective view showing insulating paper 71 according to the fourth exemplary embodiment. FIG. 15C is a perspective view showing insulating paper 72 according to the fourth exemplary embodiment. FIG. 15D is a perspective view showing coil 57 according to the fourth exemplary embodiment.

Coil 5 has the same configuration as coil 5 of FIG. 2, except insulating film 5b and insulating members 6.

Insulating paper 71 has a square-cornered U-shape. Material of insulating paper 71 is aramid (wholly aromatic polyamide), short fiber (floc), synthetic pulp (fibrid), kraft pulp, Manila hemp, cotton, paper bush, polyethylene terephthalate (PET), or the like. A plurality sheets of insulating paper 71 are connected to form insulating paper 72 shown in FIG. 15C.

Sheets of insulating paper 71 are inserted from the right side and the left side of coil 5 into between neighboring turns of coil 5 to form coil 57 shown in FIG. 15D.

Figure 16:
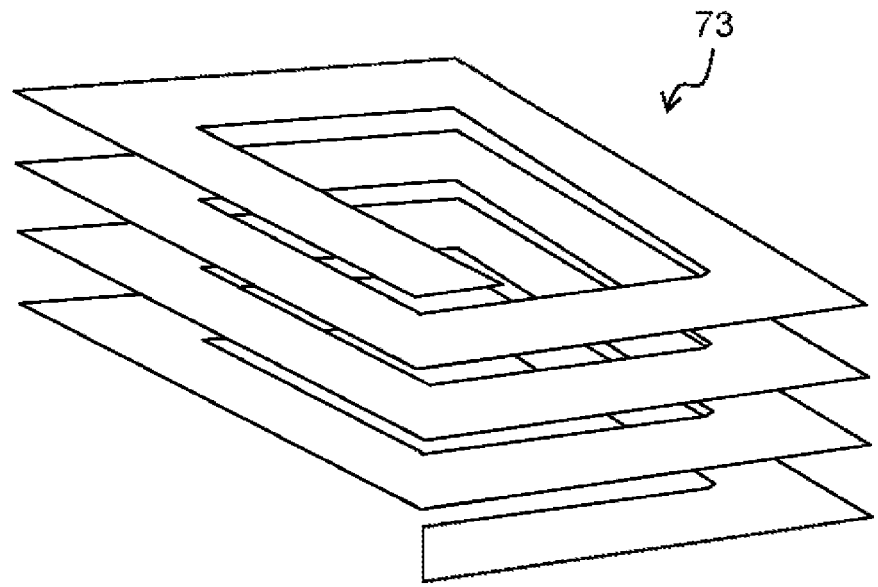
FIG. 16 is a perspective view showing another insulating paper according to the fourth exemplary embodiment.

FIG. 16 is a perspective view showing another insulating paper 73 according to the fourth exemplary embodiment. The difference between insulating paper 72 and insulating paper 73 is as follows. While insulating paper 72 is formed of a plurality sheets of insulating paper 71 connected to each other, insulating paper 73 is formed of a shingle sheet of paper.

Figure 17:
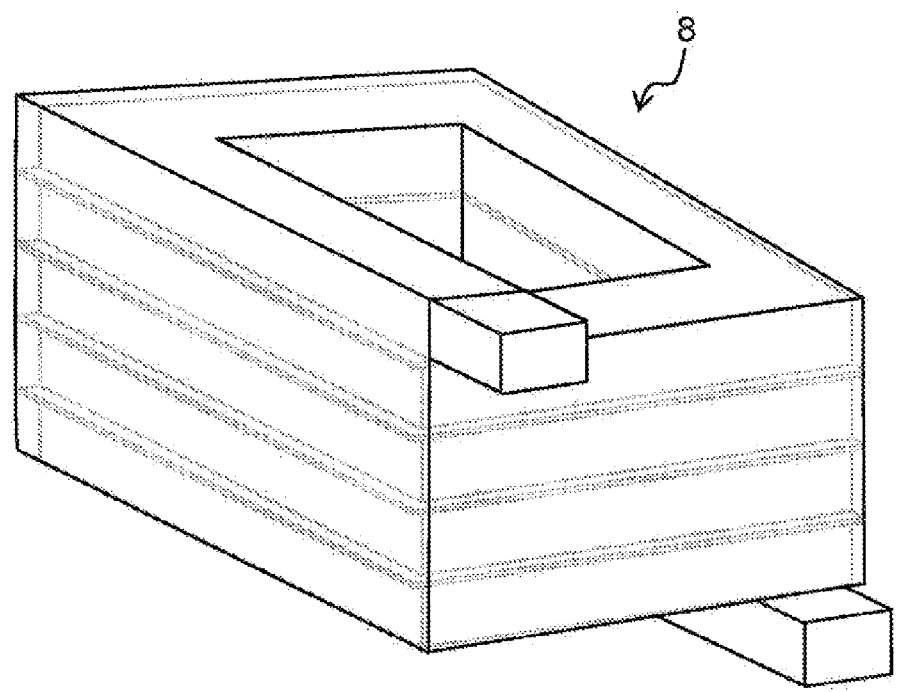
FIG. 17 is a perspective view showing a molded coil according to the fourth exemplary embodiment.

FIG. 17 is a perspective view showing molded coil 8 according to the fourth exemplary embodiment. Molded coil 8 is obtained by molding the coil 57.

According to the present exemplary embodiment, insulating paper maintains gaps between neighboring turns of coil 57 at a predetermined distance. Therefore, insulation between neighboring turns of coil 57 can be surely secured. As a result, a withstand voltage of coil 57 can be maintained.

Fifth Exemplary Embodiment

Figure 18A:
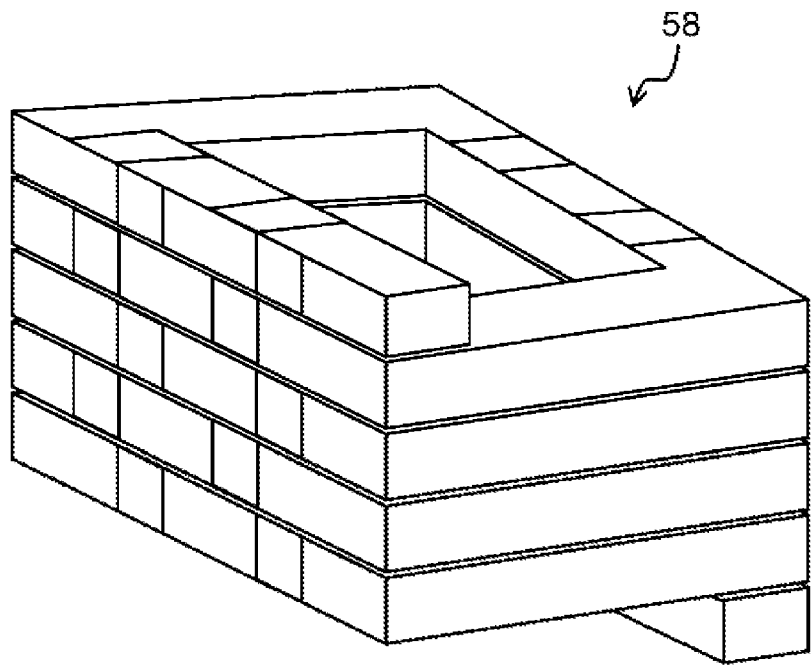
FIG. 18A is a perspective view showing a coil according to a fifth exemplary embodiment.
Figure 18B:
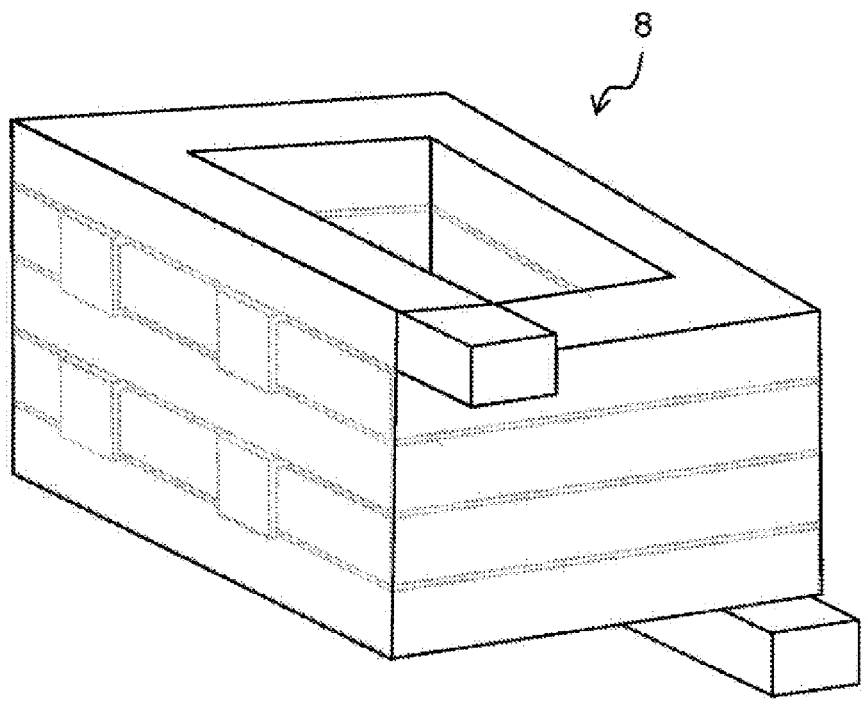
FIG. 18B is a perspective view showing a molded coil according to the fifth exemplary embodiment.

FIG. 18A is a perspective view showing coil 58 according to a fifth exemplary embodiment. FIG. 18B is a perspective view showing molded coil 8 according to the fifth exemplary embodiment.

Coil 58 is obtained by inserting insulating paper 73 shown in FIG. 16 between neighboring turns of coil 5 shown in FIG. 15A.

Molded coil 8 is obtained by molding of coil 58.

The molding makes it possible to obtain a highly reliable molded coil 8. Regarding a part of insulation defect of electrodeposition coating between coil layers and between neighboring coils or a part of insulation defect of insulating paper, molding can generate an insulating coat in such a manner to compensate the defect. Further, molding is effective in making an overall shape of the coil uniform. This enables clearances between neighboring coils to be constant when the coils are assembled on the teeth, and it can be therefore expected that the coils is prevented from coming into contact with each other during a forming process and that decrease in reliability due to breakdown is therefore prevented.

Sixth Exemplary Embodiment

Figure 19:
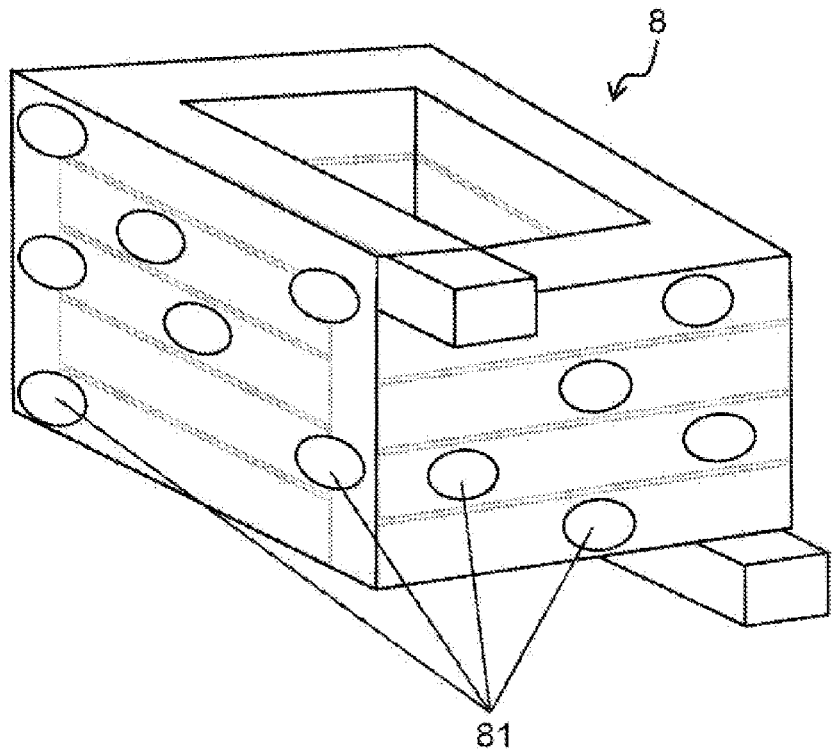
FIG. 19 is a perspective view showing a molded coil according to a sixth exemplary embodiment.

FIG. 19 is a perspective view showing molded coil 8 according to a sixth exemplary embodiment.

With reference to FIG. 19, coil cooling windows 81 are parts with which a supporting unit (not shown) comes into contact at the time of molding. In coil cooling windows 81 there is no resin formed, and the coil is exposed and is therefore easily cooled.

This configuration provides a highly reliable molded coil 8, and a coil cooling effect improves motor characteristics. Regarding a part of insulation defect of electrodeposition coating between coil layers and between neighboring coils or a part of insulation defect of insulating paper, molding can generate an insulating coat in such a manner to compensate the defect. Further, molding is effective in making an overall shape of the coil uniform. This enables clearances between neighboring coils to be constant when the coils are assembled on the teeth, and it can be therefore expected that the coils is prevented from coming into contact with each other during a forming process and that decrease in reliability due to breakdown is therefore prevented.

Seventh Exemplary Embodiment

Figure 20:
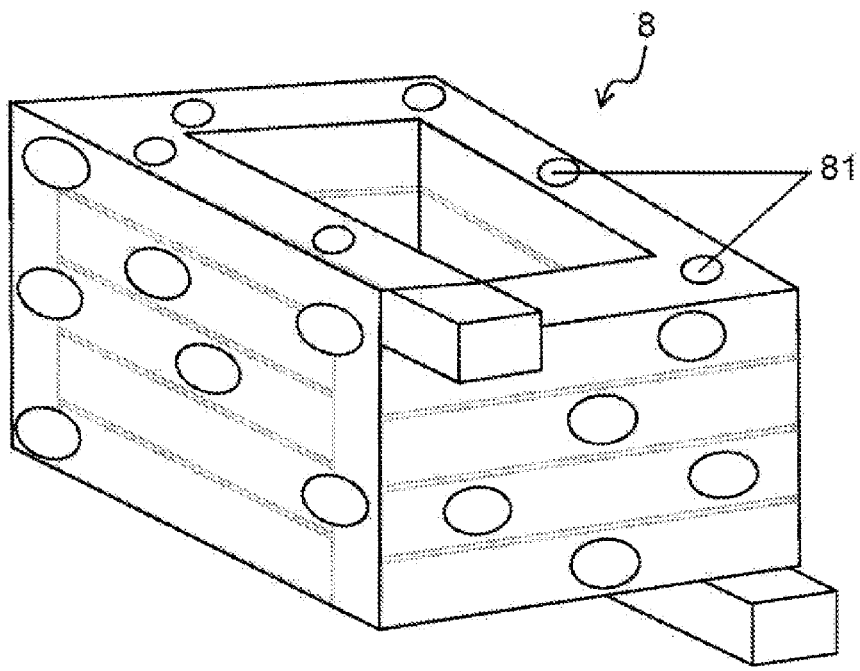
FIG. 20 is a perspective view showing a molded coil according to a seventh exemplary embodiment.

FIG. 20 is a perspective view showing molded coil 8 according to a seventh exemplary embodiment.

With reference to FIG. 20, molded coil 8 has coil cooling windows 81 formed on not only the front surface and the side surfaces of the coil but also the upper surface of the coil. This configuration enables the coil to be more easily cooled.

This configuration provides a highly reliable molded coil 8, and a coil cooling effect improves motor characteristics. Regarding a part of insulation defect of electrodeposition coating between coil layers and between neighboring coils or a part of insulation defect of insulating paper, molding can generate an insulating coat in such a manner to compensate the defect. Further, molding is effective in making an overall shape of the coil uniform. This enables clearances between neighboring coils to be constant when the coils are assembled on the teeth, and it can be therefore expected that the coils is prevented from coming into contact with each other during a forming process and that decrease in reliability due to breakdown is therefore prevented.

Eighth Exemplary Embodiment

Figure 21:
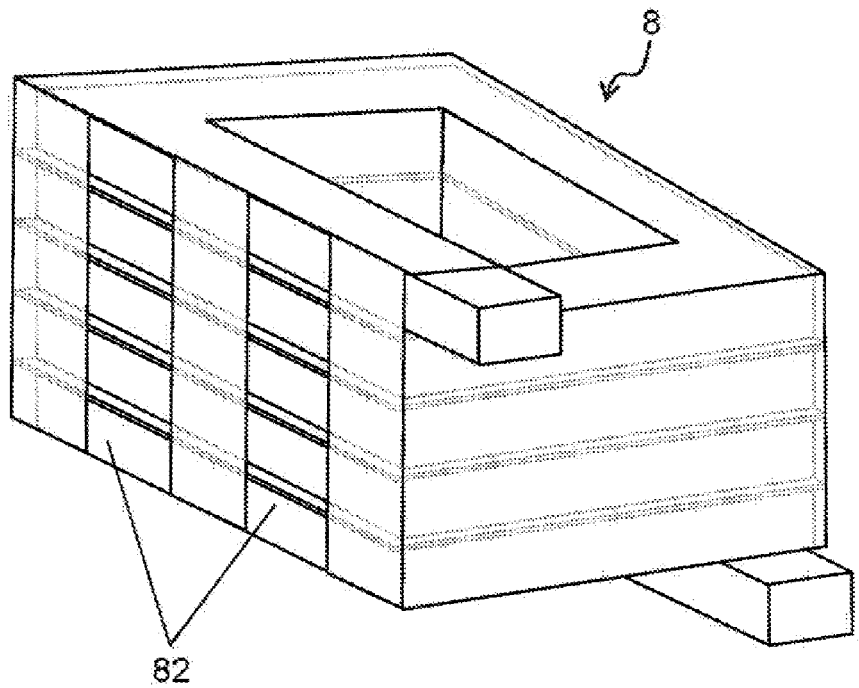
FIG. 21 is a perspective view showing a molded coil according to an eighth exemplary embodiment.
Figure 22:
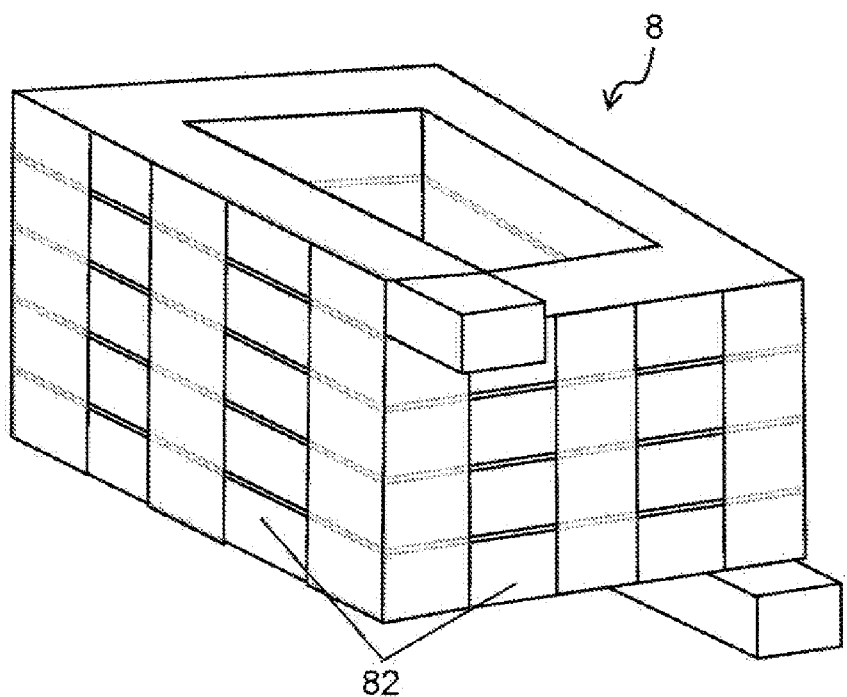
FIG. 22 is a perspective view showing another molded coil according to the eighth exemplary embodiment.
Figure 23:
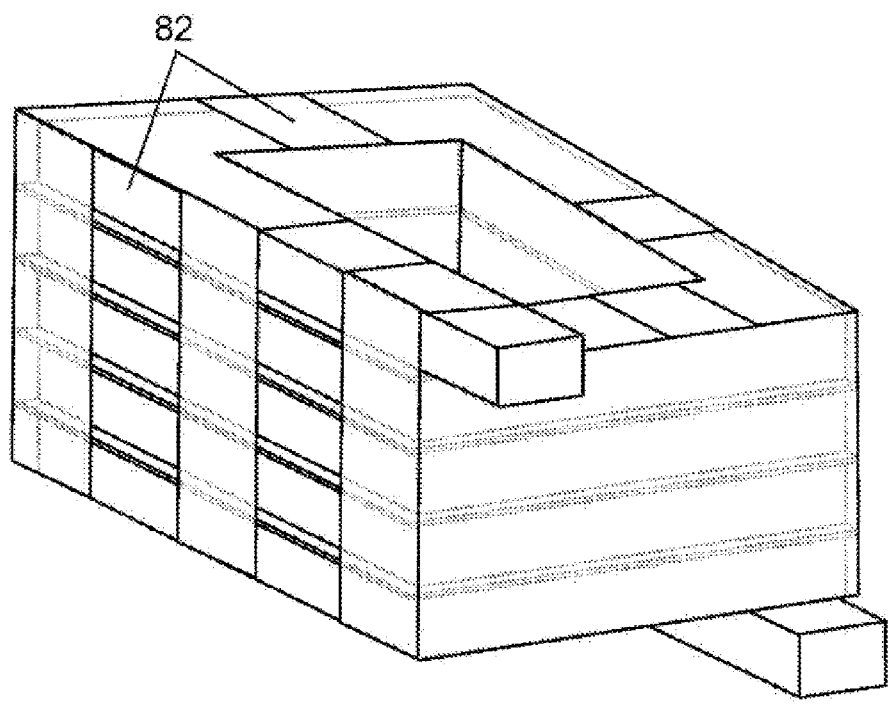
FIG. 23 is a perspective view showing still another molded coil according to the eighth exemplary embodiment.

FIG. 21 is a perspective view showing molded coil 8 according to an eighth exemplary embodiment. FIG. 22 is a perspective view showing another molded coil 8 according to the eighth exemplary embodiment. FIG. 23 is a perspective view showing still another molded coil 8 according to the eighth exemplary embodiment.

With reference to FIG. 21, molded coil 8 has line parts 82 formed on the side surfaces of the coil, and there is no resin formed on line parts 82. On line parts 82, the coil is exposed and is therefore easily cooled.

With reference to FIG. 22, molded coil 8 has line parts 82 formed on the side surfaces and the front surface of the coil, and there is no resin formed on line parts 82. This configuration enables the coil to be more easily cooled.

With reference to FIG. 23, molded coil 8 has line parts 82 formed on the side surfaces and the upper surface of the coil, and there is no resin formed on line parts 82. This configuration enables the coil to be more easily cooled.

This provides highly reliable molded coil 8. Regarding a part of insulation defect of electrodeposition coating between coil layers and between neighboring coils or a part of insulation defect of insulating paper, molding can generate an insulating coat in such a manner to compensate the defect. Further, molding is effective in making an overall shape of the coil uniform. This enables clearances between neighboring coils to be constant when the coils are assembled on the teeth, and it can be therefore expected that the coils is prevented from coming into contact with each other during a forming process and that decrease in reliability due to breakdown is therefore prevented.

INDUSTRIAL APPLICABILITY

The coil according to the present disclosure can surely insulate between neighboring turns of the coil, and a withstand voltage of the coil can be maintained Therefore, the coil is usefully applied for motors or power instruments.

REFERENCE MARKS IN THE DRAWINGS

1: motor
2: shaft
2*a*: hollow part
2*b*: through hole
3: rotor
4: stator
5, 57, 58: coil
5*a*: conductive wire
5*b*: insulating film (insulating layer)
5*c*, 5*d*: lead-out part
5*e*: recessed part (positioning part)
6, 61, 62, 63: insulating member
8: molded coil
10: electrodeposition coating device
12: electrode member
13: transfer head
14: transfer conveyer
15: aqueous solution
16: pretreatment tank
17: electrodeposition tank
18: counter electrode
19: power supply unit
20: electrodeposition coating liquid
31: magnet
41: stator core
42: tooth
43: slot
51-54: bus bar
61*a*, 62*a*, 63*a*: intervening part
61*b*, 62*b*, 63*b*: coupler
71, 72, 73: insulating paper
81: coil cooling window
82: line part
C: cooling medium
U11, U22, U32, U41, V12, V21, V31, V42, W11, W22, W32, W41: coil

The invention claimed is:

1. A coil comprising:
a series of turns constituted by a first turn to an n-th turn of a conductive wire having a polygonal cross-section, where n is an integer equal to or larger than 3, the conductive wire being wound in a spiral shape and being stacked in a direction from downward toward upward;
an insulating member disposed between an i-th turn and a turn adjacent to the i-th turn in an upward direction on an upper surface of the i-th turn or between the i-th turn and a turn adjacent to the i-th turn in a downward direction on a lower surface of the i-th turn, where i is an integer satisfying $1 \leq i \leq n$, wherein the upper surface of the i-th turn and the lower surface of the i-th turn extend perpendicularly to the axial direction of the coil; and
a positioning part that is provided on at least one of: a surface, of an (i−1)th turn, facing the i-th turn; and a surface, of the i-th turn, facing the (i−1)th turn and that is configured to hold the insulating member while positioning the insulating member.

2. The coil according to claim 1, wherein the insulating member further includes:
intervening parts one of which is provided to intervene between the i-th turn and a turn adjacent to the i-th turn and another of which is provided to intervene between a j-th turn and a turn adjacent to the j-th turn, where j is an integer satisfying $1 \leq j \leq n$ and $i \neq j$; and
a coupler that couples the intervening parts to each other on an outer peripheral side of the conductive wire.

3. The coil according to claim 2, wherein
the intervening parts are each disposed to intervene between each of all neighboring turns of the conductive wire, and
the coupler couples all of the intervening parts to each other on an outer peripheral side of all of the turns.

4. The coil according to claim 2, wherein
the insulating member is constituted by a single sheet of insulating paper, and
each of the intervening parts is formed in such a manner that a part of the insulating member having been cut out is bent.

5. The coil according to claim 1, wherein
the i-th turn is constituted by the conductive wire wound in a rectangular shape, and
a following relationship is satisfied, $$4 < L/(W1+W2+H1+H2) < 22.3$$

where W1 is a width, of the conductive wire at the i-th turn, on an upper surface side, W2 is a width, of the conductive wire at the i-th turn, on a lower surface side, H1 is a thickness, of the conductive wire at the i-th turn, on an inner peripheral side, H2 is a thickness, of the conductive wire at the i-th turn, of an outer peripheral side, and L is a length, of the conductive wire, on an inner peripheral side of one side of the rectangular shape at the i-th turn.

6. A coil comprising:
a series of turns constituted by a first turn to an n-th turn of a conductive wire having a polygonal cross-section, where n is an integer equal to or larger than 3, the conductive wire being wound in a spiral shape and being stacked in a direction from downward toward upward; and
an insulating member disposed between an i-th turn and a turn adjacent to the i-th turn in an upward direction on an upper surface of the i-th turn or between the i-th turn and a turn adjacent to the i-th turn in a downward direction on a lower surface of the i-th turn, where i is an integer satisfying $1 \leq i \leq n$,
wherein the upper surface of the i-th turn and the lower surface of the i-th turn extend perpendicularly to the axial direction of the coil, and
an insulating film is provided on an entire surface of the conductive wire, and the insulating film is in contact with the insulating member directly.

7. A coil comprising:
a series of turns constituted by a first turn to an n-th turn of a conductive wire having a polygonal cross-section, where n is an integer equal to or larger than 3, the conductive wire being wound in a spiral shape and being stacked in a direction from downward toward upward; and
an insulating member disposed between an i-th turn and a turn adjacent to the i-th turn in an upward direction on an upper surface of the i-th turn or between the i-th turn and a turn adjacent to the i-th turn in a downward direction on a lower surface of the i-th turn, where i is an integer satisfying $1 \leq i \leq n$,
wherein the upper surface of the i-th turn and the lower surface of the i-th turn extend perpendicularly to the axial direction of the coil, and
each of the first turn to the n-th turn of the coil have four coil sides, and the insulating member is provided on the four coil sides.

* * * * *